United States Patent
Scheepens et al.

(10) Patent No.: US 11,892,934 B2
(45) Date of Patent: *Feb. 6, 2024

(54) PROCESS TREE DISCOVERY USING A PROBABILISTIC INDUCTIVE MINER

(71) Applicant: UiPath, Inc., New York, NY (US)

(72) Inventors: Roeland Johannus Scheepens, Eindhoven (NL); Dennis Brons, Eindhoven (NL)

(73) Assignee: UiPath, Inc., New York, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/161,725

(22) Filed: Jan. 29, 2021

(65) Prior Publication Data

US 2022/0075706 A1 Mar. 10, 2022

Related U.S. Application Data

(63) Continuation-in-part of application No. 17/013,624, filed on Sep. 6, 2020, now Pat. No. 11,500,756.

(51) Int. Cl.
  *G06F 11/34* (2006.01)
  *G06F 16/901* (2019.01)
  (Continued)

(52) U.S. Cl.
  CPC ...... *G06F 11/3476* (2013.01); *G06F 11/3409* (2013.01); *G06F 16/285* (2019.01);
  (Continued)

(58) Field of Classification Search
  CPC ............... G06F 11/3476; G06F 16/285; G06F 16/9024; G06F 11/3409; G06F 2201/86; G06Q 10/0633
  See application file for complete search history.

(56) References Cited

U.S. PATENT DOCUMENTS 11,070,573 B1 7/2021 Edwards et al.
2004/0128001 A1 7/2004 Levin et al.
(Continued)

FOREIGN PATENT DOCUMENTS

CN 109033368 A 12/2018
CN 109460391 A 3/2019
(Continued)

OTHER PUBLICATIONS

A.K. Alves de Medeiros et al., "Process Mining Based on Clustering: A Quest for Precision", [Online], pp. 1-12, [Retrieved from Internet on Aug. 3, 2022], <https://citeseerx.ist.psu.edu/viewdoc/download?doi=10.1.1.74.9457&rep=rep1&type=pdf> (Year: 2007).*
(Continued)

*Primary Examiner* — Ziaul A Chowdhury
(74) *Attorney, Agent, or Firm* — Chiesa Shahinian & Giantomasi PC

(57) ABSTRACT

Systems and methods for generating a process tree of a process are provided. An event log of the process is received. It is determined whether a base case applies to the event log and, in response to determining that the base case applies to the event log, one or more nodes are added to the process tree. In response to determining that the base case does not apply to the event log, the event log is split into sub-event logs and one or more nodes are added to the process tree. The steps of determining whether a base case applies and splitting the event log are repeatedly performed for each respective sub-event log using the respective sub-event log as the event log until it is determined that the base case applies to the event log. The process tree is output. The process may be a robotic process automation process.

9 Claims, 15 Drawing Sheets

(51) Int. Cl.
*G06F 16/28* (2019.01)
*G06Q 10/0633* (2023.01)

(52) U.S. Cl.
CPC ..... *G06F 16/9024* (2019.01); *G06Q 10/0633* (2013.01); *G06F 2201/86* (2013.01)

(56) References Cited

U.S. PATENT DOCUMENTS

| | | |
|---|---|---|
| 2004/0260590 A1 | 12/2004 | Golani et al. |
| 2009/0112667 A1 | 4/2009 | Blackwell et al. |
| 2014/0172919 A1 | 6/2014 | Johnston et al. |
| 2015/0254158 A1 | 9/2015 | Puri et al. |
| 2017/0111245 A1 | 4/2017 | Ishakian et al. |
| 2017/0213167 A1* | 7/2017 | Rinke ............... G06F 16/2465 |
| 2017/0286190 A1* | 10/2017 | Ishakian ............... G06F 9/542 |
| 2019/0050317 A1 | 2/2019 | Melville et al. |
| 2019/0286504 A1 | 9/2019 | Muntes-Mulero et al. |
| 2019/0370102 A1 | 12/2019 | Settle |
| 2020/0193094 A1 | 6/2020 | Topol |
| 2020/0272531 A1 | 8/2020 | Johnston et al. |
| 2020/0380136 A1* | 12/2020 | Patel ..................... G06F 21/577 |
| 2021/0382770 A1 | 12/2021 | Lu et al. |

FOREIGN PATENT DOCUMENTS

| | | |
|---|---|---|
| KR | 10-2020-0058123 A | 5/2020 |
| WO | 2018138601 A1 | 8/2018 |
| WO | 2020124240 A1 | 6/2020 |

OTHER PUBLICATIONS

Yang Lu et al. "A Novel Approach to Discover Switch Behaviours in Process Mining" [Online], pp. 57-68, [Retrieved from Internet on Nov. 14, 2023],<https://arxiv.org/ftp/arxiv/papers/2106/2106.12765.pdf> (Year: 2020).*

International Search Report dated Feb. 18, 2022, in connection with International Patent Application No. PCT/US2021/072196, filed Nov. 3, 2021, 10 pgs.

International Search Report dated Feb. 23, 2022, in connection with International Patent Application No. PCT/US2021/072197, filed Nov. 3, 2021, 9 pgs.

Syamsiyah et al., "Process discovery using in-database minimum self distance abstractions," 2020, SAC '20: Proceedings of the 35th Annual ACM Symposium on Applied Computing, pp. 26-35.

Vanden Broucke et al., "Fodina: A robust and flexible heuristic process discovery technique," 2017, Decision Support Systems, vol. 100, pp. 109-118.

Augusto et al., "Split Miner: Discovering Accurate and Simple Business Process Models from Event Logs," 2017, IEEE International Conference on Data Mining (ICDM), 10 pgs.

Brons et al., "Striking a new Balance in Accuracy and Simplicity with the Probabilistic Inductive Miner," 2021, IEEE International Conference on Process Mining (ICPM) 2021, 10 pgs.

Augusto et al., "Split Miner: Automated Discovery of Accurate and Simple Business Process Models from Event Logs," May 15, 2018, 34 pgs.

Leemans et al., "Discovering Block-Structured Process Models from Event Logs—A Constructive Approach," 2013, Application and Theory of Petri Nets and Concurrency, pp. 311-329.

Van der Aalst, "Process Mining, Data Science in Action," Second Edition, 2016, vol. 5, 477 pgs.

Leemans et al., "Exploring Processes and Deviations," In Lecture Notes in Business Information Processing, 2015, pp. 304-316.

Leemans, "Robust Process Mining with Guarantees," 2018, Proceedings of the Dissertation Award, Demonstration, and Industrial Track at BPM 2018. Sun SITE. pp. 46-50.

Leemans et al., "Scalable Process Discovery with Guarantees," 2015, Enterprise, Business-Process and Information Systems Modeling, pp. 85-101.

Leemans et al., "Discovering Block-Structured Process Models from Incomplete Event Logs," 2014, Application and Theory of Petri Nets and Concurrency, pp. 91-110.

Leemans et al., "Scalable Process Discovery and Conformance Checking," 2018, Software & Systems Modeling vol. 17, pp. 599-631.

Leemans et al., "Discovering Block-Structured Process Models from Event Logs Containing Infrequent Behaviour," 2013, Business Process Management Workshops, pp. 66-78.

Leemans et al., "Using Life Cycle Information in Process Discovery," 2016, Business Process Management Workshops, pp. 204-217.

Vanhatalo et al., "The Refined Process Structure Tree," Sep. 2009, Data & Knowledge Engineering, vol. 68, Issue 9, pp. 793-818.

Van der Aalst et al., "Workflow Mining: Discovering Process Models from Event Logs," Sep. 2004, IEEE Transactions on Knowledge and Data Engineering, vol. 16, Issue 9, pp. 1128-1142.

International Search Report and Written Opinion dated Jun. 4, 2021, in connection with International Patent Application No. PCT/US2020/055646, filed Oct. 15, 2020, 9 pgs.

Notice of Allowance dated Aug. 17, 2022 in connection with U.S. Appl. No. 17/161,729, filed Jan. 29, 2021, 28 pgs.

Notice of Allowance dated Jul. 13, 2022 in connection with U.S. Appl. No. 17/013,624, filed Sep. 6, 2020, 23 pgs.

* cited by examiner

300

304-A  304-B  304-C

| Case ID | Activity | Time Stamp |
|---|---|---|
| 1 | Activity A | 01/01/2020 10:00:00 |
| 1 | Activity B | 01/01/2020 10:00:02 |
| 1 | Activity C | 01/01/2020 10:00:12 |
| 2 | Activity A | 01/01/2020 10:04:32 |
| 2 | Activity C | 01/01/2020 10:04:56 |
| 3 | Activity D | 01/01/2020 10:05:18 |
| 4 | Activity D | 01/01/2020 10:07:11 |
| 4 | Acitvity A | 01/01/2020 10:07:31 |
| 4 | Activity D | 01/01/2020 10:07:46 |
| 5 | Activity D | 01/01/2020 10:25:26 |
| 5 | Activity B | 01/01/2020 10:26:05 |
| 5 | Activity D | 01/01/2020 10:26:41 |
| 6 | Activity A | 01/01/2020 10:32:49 |
| 6 | Activity C | 01/01/2020 10:32:58 |
| 6 | Activity A | 01/01/2020 10:33:22 |
| 6 | Activity C | 01/01/2020 10:33:41 |

```
┌─────────────────────────────────────────────────────────────────────┐
│ Determine, from a plurality of activities forming a loop in an event│
│ log, one or more activities corresponding to a body start portion of│
│ the loop, one or more activities corresponding to a body end portion│
│ of the loop, one or more activities corresponding to a redo start   │
│ portion of the loop, one or more activities corresponding to a redo │
│ end portion of the loop                                             │
│                               1402                                  │
└─────────────────────────────────────────────────────────────────────┘
                                  │
                                  ▼
┌─────────────────────────────────────────────────────────────────────┐
│ Generate a first cluster comprising the one or more activities      │
│ corresponding to the body start portion of the loop and the one or  │
│ more activities corresponding to the body end portion of the loop   │
│                               1404                                  │
└─────────────────────────────────────────────────────────────────────┘
                                  │
                                  ▼
┌─────────────────────────────────────────────────────────────────────┐
│ Generate a second cluster comprising the one or more activities     │
│ corresponding to the redo start portion of the loop and the one or  │
│ more activities corresponding to the redo end portion of the loop   │
│                               1406                                  │
└─────────────────────────────────────────────────────────────────────┘
                                  │
                                  ▼
┌─────────────────────────────────────────────────────────────────────┐
│ Add each respective remaining activity of the plurality of          │
│ activities to one of the first cluster or the second cluster based  │
│ on: 1) a first frequency of occurrence of the respective remaining  │
│ activity between the one or more activities corresponding to the    │
│ body start portion of the loop and the one or more activities       │
│ corresponding to the body end portion of the loop, and 2) a second  │
│ frequency of occurrence of the respective remaining activity        │
│ between the one or more activities corresponding to the redo start  │
│ portion of the loop and the one or more activities corresponding to │
│ the redo end portion of the loop                                    │
│                               1408                                  │
└─────────────────────────────────────────────────────────────────────┘
                                  │
                                  ▼
┌─────────────────────────────────────────────────────────────────────┐
│ Determine a cut location for the event log based on the first       │
│ cluster and the second cluster                                      │
│                               1410                                  │
└─────────────────────────────────────────────────────────────────────┘
                                  │
                                  ▼
┌─────────────────────────────────────────────────────────────────────┐
│ Split the event log into sub-event logs based on the location       │
│                               1412                                  │
└─────────────────────────────────────────────────────────────────────┘
```

Fig. 14

PROCESS TREE DISCOVERY USING A PROBABILISTIC INDUCTIVE MINER

CROSS-REFERENCE TO RELATED APPLICATIONS

This application is a continuation-in-part of U.S. patent application Ser. No. 17/013,624, filed Sep. 6, 2020, the disclosure of which is incorporated by reference herein in its entirety.

TECHNICAL FIELD

The present invention relates generally to computer process mining, and more particularly to process tree discovery using a probabilistic inductive miner for generating process trees of computer processes that are usable, understandable, and accurate.

BACKGROUND

Computer processes are sequences of activities executed by one or more computers to provide various services. In process mining, process model discovery techniques are applied for generating process models that represent execution of processes. Existing process model discovery techniques generate formal process models capable of expressing complex behavior such as parallelism. However, existing process model discovery techniques generate process models that are too complex to be utilized in many applications.

BRIEF SUMMARY OF THE INVENTION

In accordance with one or more embodiments, systems and methods for generating a process tree of a process are provided. An event log of the process is received. It is determined whether a base case applies to the event log and, in response to determining that the base case applies to the event log, one or more nodes are added to the process tree. In response to determining that the base case does not apply to the event log, the event log is split into sub-event logs based on a frequency of directly follows relations and a frequency of strictly indirectly follows relations for pairs of activities in the event log and one or more nodes are added to the process tree. The steps of determining whether a base case applies and splitting the event log are repeatedly performed for each respective sub-event log using the respective sub-event log as the event log until it is determined that the base case applies to the event log. The process tree is output. The process may be a robotic process automation process.

In one embodiment, the event log is split by generating a directly follows graph of the event log and an indirectly follows graph of the event log, filtering the directly follows graph and the indirectly follows graph, calculating activity relation scores for relationship operators for pairs of activities in the event log based on the filtered directly follows graph and the filtered indirectly follows graph, determining, based on the activity relation scores, 1) a cut location in the event log and 2) a relationship operator node representing behavior between the sub-event logs, and splitting the event log into the sub-event logs based on the cut location.

In one embodiment, the directly follows graph and the indirectly follows graph are filtered by sorting pairs of activities in the event log that are in directly follows relation or strictly indirectly follows relation, identifying pairs of activities in the sorted pairs of activities based on a filter threshold value, and removing edges connecting the identified pairs of activities in the directly follows graph and the indirectly follows graph. The filter threshold value may be user defined.

In one embodiment, the cut location and the relationship operator node are determined by calculating cut scores for potential cut locations based on the activity relation scores and determining, based on the cut scores, 1) the cut location from the potential cut locations and 2) the relationship operator node.

In one embodiment, splitting the event log into sub-event logs based on a frequency of directly follows relations and a frequency of strictly indirectly follows relations for pairs of activities in the event log and adding one or more nodes to the process tree includes adding a relationship operator node representing behavior between the sub-event logs and a child node of the relationship operator node for each of the sub-event logs.

In one embodiment, determining whether a base case applies to the event log and, in response to determining that the base case applies to the event log, adding one or more nodes to the process tree includes determining that a skip log case applies to the event log and, in response to determining that the skip log case applies to the event log, an exclusive choice node is added to the process tree with a first child node representing a silent activity and a second child node for the event log.

In one embodiment, a process model may be generated based on the process tree.

In accordance with one or more embodiments, systems and methods for generating a process tree of a process are provided. An event log of the process is received. It is determined whether a base case applies to the event log and, in response to determining that the base case applies to the event log, one or more nodes are added to the process tree. In response to determining that the base case does not apply to the event log, the event log is split into sub-event logs and one or more nodes are added to the process tree. The steps of determining whether a base case applies and splitting the event log are repeatedly performed for each respective sub-event log using the respective sub-event log as the event log until it is determined that the base case applies to the event log. The process tree is output. The process may be a robotic process automation process.

In one embodiment, activity relation scores are calculated for pairs of activities in an exclusive choice relationship or a parallel relationship in an event log. An undirected graph of the activities is generated based on the activity relation scores. Weights of edges of the undirected graph are inverted. An average minimum cut is determined on the undirected graph based on the inverted weights of the edges to determine a cut location of the event log. The event log is split into sub-event logs based on the cut location.

In one embodiment, a directed graph of activities in a sequence relationship in the event log is generated. An activity is selected from the directed graph with a highest forward connectivity. One or more activities are identified as being directly connected to the selected activity. It is determined whether all activities in the directed graph have been selected or identified. In response to determining that all activities in the directed graph have not been selected or identified, an unselected and unidentified activity with a highest forward connectivity is selected from the directed graph and the steps of identifying and determining are repeated using the unselected and unidentified activity with the highest forward connectivity as the selected activity until it is determined that all activities in the directed graph have been selected or identified to thereby generate a cluster comprising the selected activities. The steps of selecting the activity, identifying, determining, and selecting the unselected and unidentified activity are repeated using the directed graph with the selected activities omitted until all activities in the directed graph have been selected to thereby generate respective clusters comprising the selected activities. One or more cut locations of the event log are determined based on the clusters. The event log is split into sub-event logs based on the cut location.

In one embodiment, one or more activities corresponding a body start portion of a loop, one or more activities corresponding to a body end portion of the loop, one or more activities corresponding to a redo start portion of the loop, and one or more activities corresponding to a redo end portion of the loop are determined from a plurality of activities forming the loop in the event log. A first cluster comprising the one or more activities corresponding to the body start portion of the loop and the one or more activities corresponding to the body end portion of the loop is generated. A second cluster comprising the one or more activities corresponding to the redo start portion of the loop and the one or more activities corresponding to the redo end portion of the loop is generated. Each respective remaining activity of the plurality of activities is added to one of the first cluster or the second cluster based on: 1) a first frequency of occurrence of the respective remaining activity between the one or more activities corresponding to the body start portion of the loop and the one or more activities corresponding to the body end portion of the loop, and 2) a second frequency of occurrence of the respective remaining activity between the one or more activities corresponding to the redo start portion of the loop and the one or more activities corresponding to the redo end portion of the loop. A cut location for the event log is determined based on the first cluster and the second cluster. The event log is split into sub-event logs based on the cut location. In one embodiment, the one or more activities corresponding to the body start portion of the loop is determined as being all activities of the plurality of activities occurring as the first activity in a trace of the event log. The one or more activities corresponding to the body end portion of the loop is determined as being all activities of the plurality of activities occurring as the last activity in a trace of the event log. The one or more activities corresponding to the redo start portion of the loop is determined as being all activities of the plurality of activities that directly follow each of the one or more activities corresponding to the body end portion of the loop for a threshold number of times. The one or more activities corresponding to the redo end portion of the loop is determined as being all activities of the plurality of activities that directly precede each of the one or more activities corresponding to the body start portion of the loop for a threshold number of times. In one embodiment, the respective remaining activity is added to the first cluster where the first frequency of occurrence of the respective remaining activity is greater than the second frequency of occurrence of the respective remaining activity and the respective remaining activity is added to the second cluster where the first frequency of occurrence of the respective remaining activity is not greater than the second frequency of occurrence of the respective remaining activity.

In one embodiment, systems and methods for splitting an event log into sub-event logs is provided. The event log of a process is received. An activity relation score for a parallel relationship operator is calculated for each respective pair of activities of a plurality of pairs of activities in the event log based on 1) a frequency of occurrence of a first activity of the respective pair of activities between occurrences of a second activity of the respective pair of activities and 2) a frequency of occurrence of the second activity between occurrences of the first activity. A cut location in the event log is determined based on the activity relation scores. The event log is split into the sub-event logs based on the cut location.

In one embodiment, the activity relation scores are calculated by comparing a frequency of occurrence of the second activity with the frequency of occurrence of the first activity between occurrences of the second activity and comparing a frequency of occurrence of the first activity with the frequency of occurrence of the second activity between occurrences of the first activity.

In one embodiment, comparing a frequency of occurrence of the second activity with the frequency of occurrence of the first activity between occurrences of the second activity comprises dividing the frequency of occurrence of the first activity between occurrences of the second activity by the frequency of occurrence of the second activity. Comparing a frequency of occurrence of the first activity with the frequency of occurrence of the second activity between occurrences of the first activity comprises dividing the frequency of occurrence of the second activity between occurrences of the first activity by the frequency of occurrence of the first activity.

In one embodiment, one or more nodes are added to a process tree for each of the sub-event logs to generate the process tree of the process.

In one embodiment, a directly follows graph of the event log and an indirectly follows graph of the event log are generated. The directly follows graph and the indirectly follows graph are filtered. The activity relation scores are calculated based on the filtered directly follows graph and the filtered indirectly follows graph.

In one embodiment, a process model is generated based on the process tree. The process may be a robotic process automation process.

These and other advantages of the invention will be apparent to those of ordinary skill in the art by reference to the following detailed description and the accompanying drawings.

BRIEF DESCRIPTION OF THE DRAWINGS

FIG. 3 shows an exemplary event log of the process shown in FIG. 1, in accordance with one or more embodiments of the invention;

FIG. 14 shows a method for splitting an event log of activities in a loop relationship into sub-event logs, in accordance with one or more embodiments.

DETAILED DESCRIPTION

Figure 1:
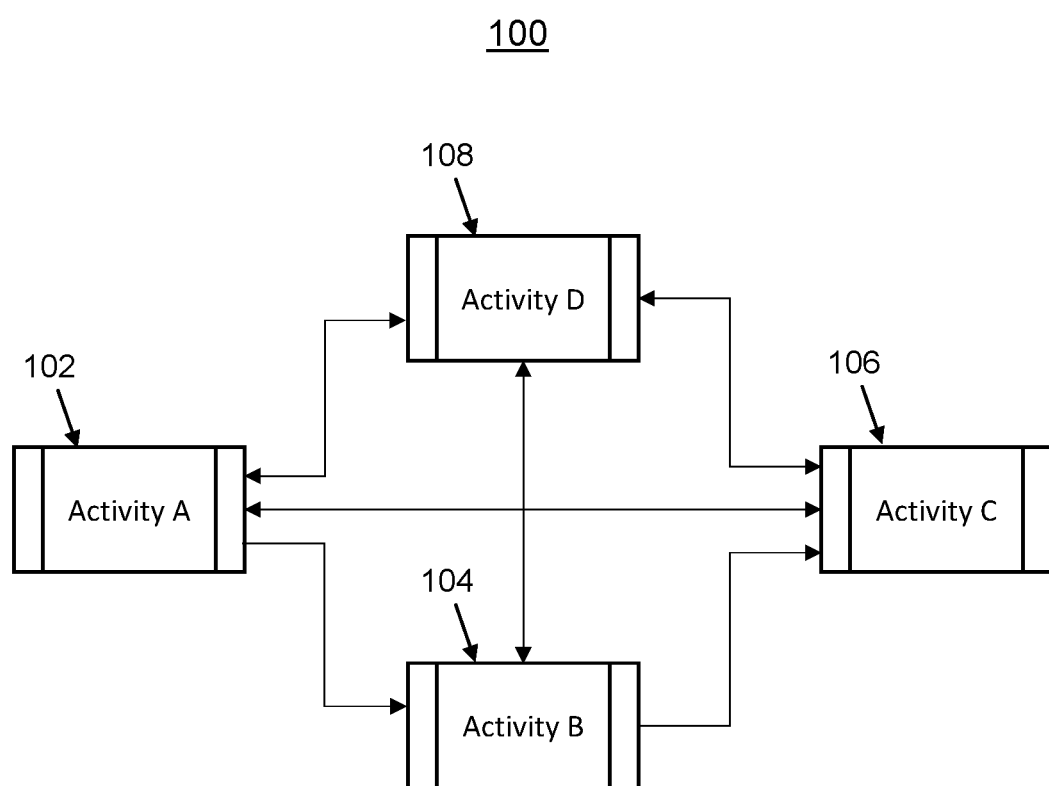
FIG. 1 shows an illustrative process in accordance with one or more embodiments of the invention.

Computer processes may be executed by one or more computers to provide services for a number of different applications, such as, e.g., administrative applications (e.g., onboarding a new employee), procure-to-pay applications (e.g., purchasing, invoice management, and facilitating payment), and information technology applications (e.g., ticketing systems). An exemplary process 100 is shown in FIG. 1. In one embodiment, process 100 may be implemented as a robotic process automation (RPA) workflow for automatically performing a task using one or more RPA robots.

Process 100 comprises Activity A 102, Activity B 104, Activity C 106, and Activity D 108, which represent a predefined sequence of steps in process 100. As shown in FIG. 1, process 100 is modeled as a directed graph where each activity 102-108 is represented as a node and each transition between activities 102-108 is represented as edges connecting the nodes. The transition between activities represents the execution of process 100 from a source activity to a destination activity. Execution of process 100 is recorded in the form of an event log.

Embodiments described herein provide for a probabilistic inductive miner system for recursively generating a process tree representing execution of a process, such as, e.g., process 100, based on an event log. In one embodiment, an event log is repeatedly and recursively split into sub-event logs. For each split, a relationship operator node is added to the process tree representing the behavior, such as, e.g., exclusive choice, sequence, parallel, or loop, between the sub-event logs. Activity nodes are recursively added for both sub-event logs as children to the relationship operator node. Before attempting to find a split in the event log, it is first determined whether a base case applies, in which case a leaf node is added representing either an activity of the process or a silent activity. This process is recursively performed for each sub-event log to provide for the recursive addition of nodes to a process tree to thereby generate the process tree representing execution of the process. Advantageously, such process trees generated in accordance with embodiments described herein may be utilized to generate process models (e.g., BPMN (business process model and notation) like models) of the process that are usable, understandable, and accurate.

Figure 2:
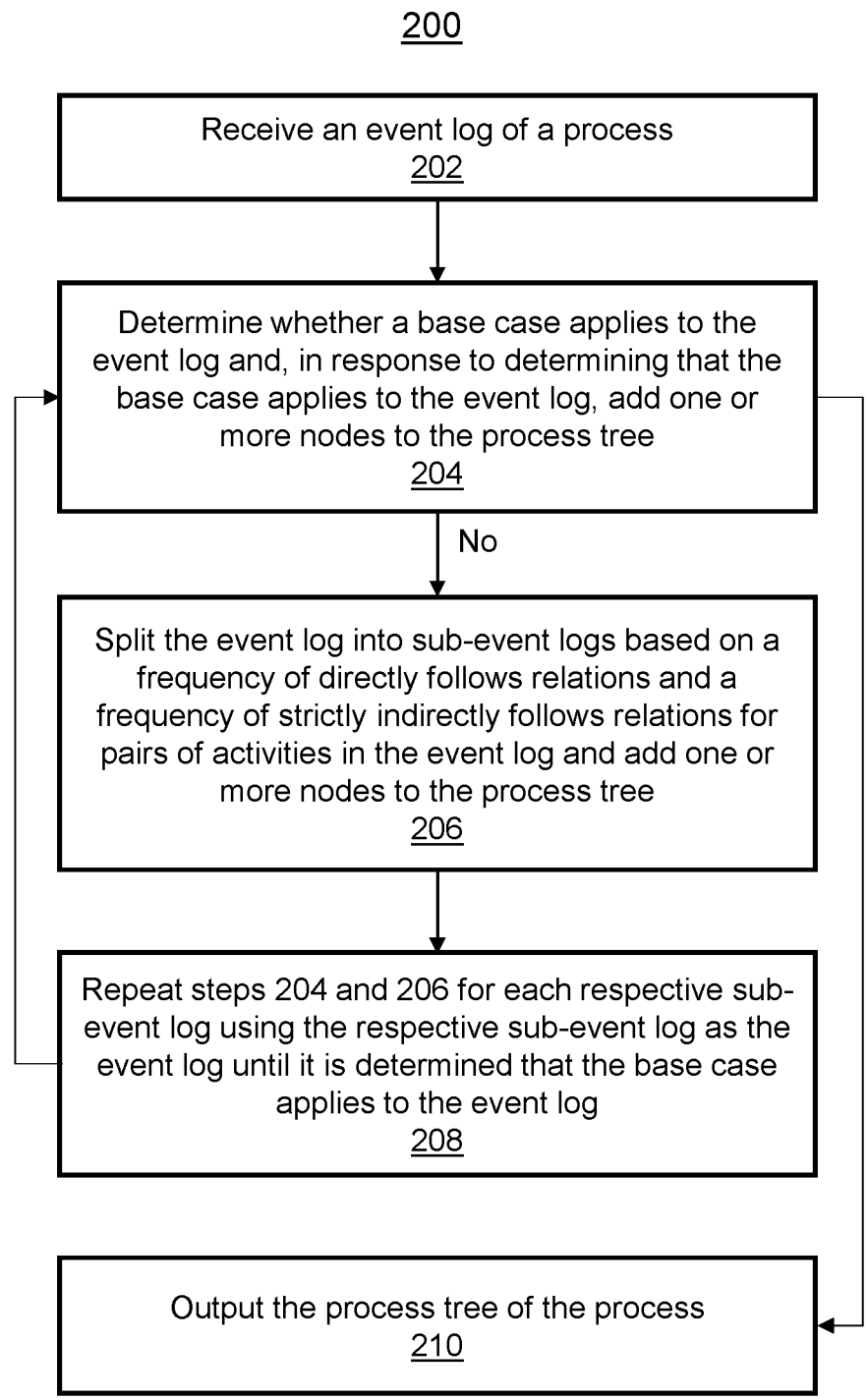
FIG. 2 shows a method for generating a process tree of a process, in accordance with one or more embodiments of the invention.

FIG. 2 shows a method 200 for generating a process tree of a process, in accordance with one or more embodiments. Various steps of method 200 are recursively performed to iteratively add nodes to the process tree to thereby generate the process tree. Method 200 will be described with continued reference to process 100 of FIG. 1. In one embodiment, the steps of method 200 are performed to generate a process tree for process 100 of FIG. 1. Method 200 may be performed by one or more suitable computing devices, such as, e.g., computing system 900 of FIG. 9.

At step 202, an event log of the process is received. The event log, denoted L, may be maintained during one or more instances of execution of the process by recording events occurring during the one or more instances of execution of the process. An event refers to the execution of an activity at a particular time and for a particular case. A case corresponds to a particular instance of execution of the process and is identified by a case identifier (ID). A trace refers to an ordered sequence of activities executed for a case. A variant refers to a frequency of occurrence of a particular trace.

FIG. 3 shows an exemplary event log 300 of process 100 of FIG. 1, in accordance with one or more embodiments. Event log 300 records events occurring during six instances of execution of process 100, corresponding to case ID 1 through case ID 6 in event log 300. As shown in FIG. 3, event log 300 is formatted as a table having rows 302 each corresponding to an event and columns 304 each identifying an attribute of the event, identified in header row 306, at a cell at which rows 302 and columns 304 intersect. In particular, each row 302 is associated with an event representing the execution of an activity 102-108 (identified in column 304-B), a time stamp of the execution of the activity 102-108 (identified in column 304-C), and a case ID identifying the instance of execution of the executed activity 102-108 (identified in column 304-A). In one embodiment, the time stamp of the execution of the activity 102-108, identified in column 304-C, refers to the time at which execution of the activity 102-108 completed, but may alternatively refer to the time at which execution of the activity 104-108 started. It should be understood that event log 300 may be in any suitable format and may include additional columns 304 identifying other attributes of events.

At step 204, it is determined whether a base case applies to the event log. A base case is a condition and may include, e.g., a single activity case, a no activity case, or a skip log case. The single activity case applies to the event log when the event log includes only a single activity. The no activity case applies to the event log when the event log does not include any activities. The skip log case applies to the event log when the number of empty traces of the event log that would have been produced exceeds a number of traces of the event log, indicating that the event log was skipped more often than it was executed. The number of empty traces in the event log that would have been produced is tracked by an empty behavior counter and is not included in the number of traces of the event log. It should be understood that the base case is not limited to a single activity case, a no activity case, or a skip log case. Other base cases are also contemplated.

In response to determining that a base case applies to the event log, one or more nodes are added to the process tree. For instance, in response to determining that a single activity case applies to the event log, a node representing that activity is added to the process tree. In response to determining that a no activity case applies to the event log, a leaf node representing a silent activity is added to the process tree. The silent activity indicates that "nothing" happens. In response to determining that a skip log case applies to the event log, an exclusive choice operator node is added to the process tree with two child nodes. The first child node is a leaf node representing a silent activity. The second child node is a node for the event log added by resetting the empty behavior counter and returning to step 204 to determine whether a base case applies to the event log.

The process tree is stored in memory (e.g., in memory 906 of computing system 900 of FIG. 9) while being generated during method 200 to enable the recursive addition of nodes in a node-by-node manner by recursively and repeatedly performing steps 204 and 206.

At step 206, in response to determining that the base case does not apply to the event log, the event log is split into sub-event logs based on a frequency of directly follows relations and a frequency of strictly indirectly follows relations for pairs of activities in the event log and one or more nodes are added to the process tree. The nodes added to the process tree include 1) a relationship operator node representing the behavior (e.g., exclusive choice, sequence, parallel, or loop) between the sub-event logs and 2) a child node for each sub-event log. The specific nodes of the child nodes are determined by recursively returning to step 204 (at step 208) and repeating steps 204 and 206 for each respective sub-event log. In one embodiment, the event log is split into sub-event logs and the relationship operator node is determined according to the steps of method 500 of FIG. 5, described in detail below.

At step 208, method 200 returns to step 204 and steps 204 and 206 are repeated for each respective sub-event log using the respective sub-event log as the event log until it is determined that the base case applies to the event log (at step 204). In this manner, method 200 recursively adds one or more nodes to the process tree for each sub-event log to thereby generate the process tree.

Figure 4:
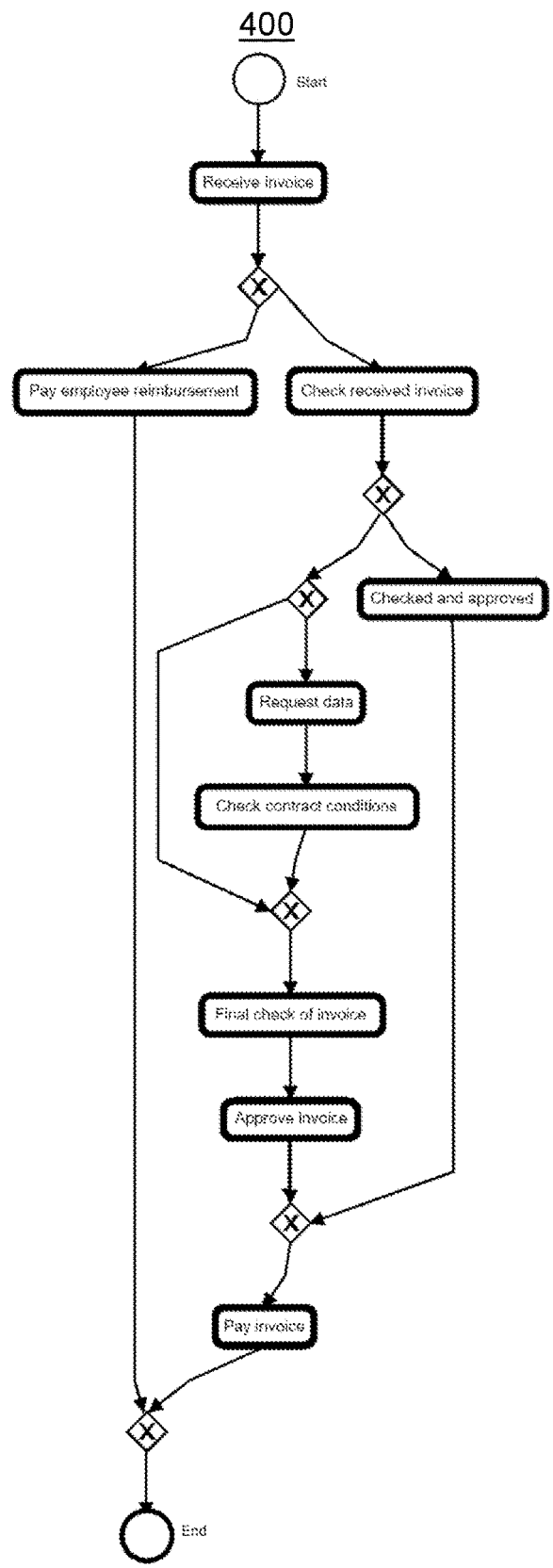
FIG. 4 shows an illustrative process tree representing execution of a process, in accordance with one or more embodiments of the invention.

At step 210, the process tree of the process is output. The process tree is output once steps 204 and 206 have been performed for all sub-event logs. In one embodiment, the process tree may be output by, for example, displaying the process tree on a display device of a computer system, storing the process tree on a memory or storage of a computer system, or by transmitting the process tree to a remote computer system. FIG. 4 shows an illustrative process tree 400 representing execution of a process, generated in accordance with one or more embodiments.

In some embodiments, the process tree may be converted to a process model, e.g., using known techniques. The process model may be, for example, a BPMN model or BPMN-like model.

Figure 5:
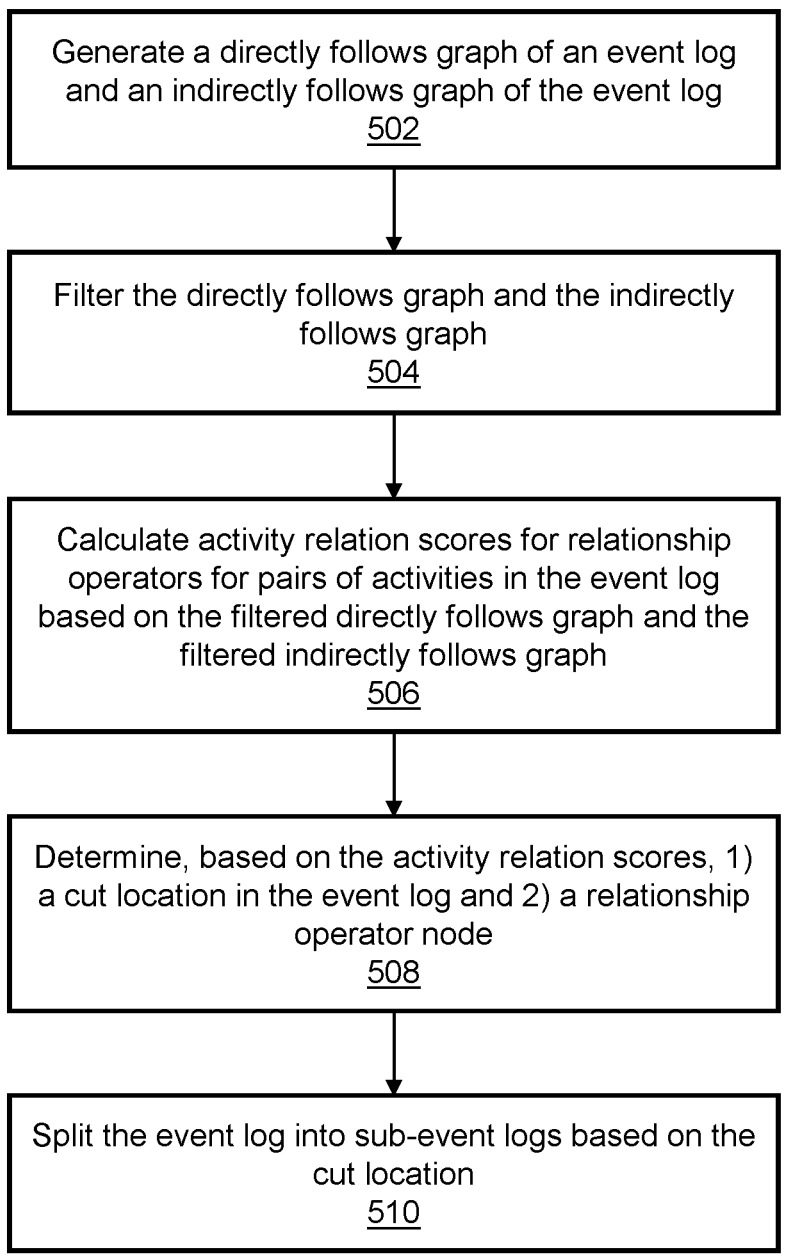
FIG. 5 shows a method for splitting an event log of a process into sub-event logs, in accordance with one or more embodiments of the invention.

FIG. 5 shows a method 500 for splitting an event log of a process into sub-event logs, in accordance with one or more embodiments. In one embodiment, the steps of method 500 are performed at step 206 of FIG. 2 to split an event log, such as, e.g., the event log of process 100 of FIG. 1, into sub-event logs and to determine a relationship operator node representing the behavior between the sub-event logs. Method 500 may be performed by one or more suitable computing devices, such as, e.g., computing system 900 of FIG. 9.

At step 502, a directly follows graph of an event log and an indirectly follows graph of the event log are generated. A directly follows graph is a directed graph comprising nodes denoting activities and edges connecting nodes of activities that are in directly follows relation. An indirectly follows graph is a directed graph comprising nodes denoting activities and edges connecting nodes of activities that are in strictly indirectly follows relation. As used herein, directly follows relation refers to activities that directly follow each other and strictly indirectly follows relation refers to activities that indirectly follow each other but do not directly follow each other.

Figure 6:
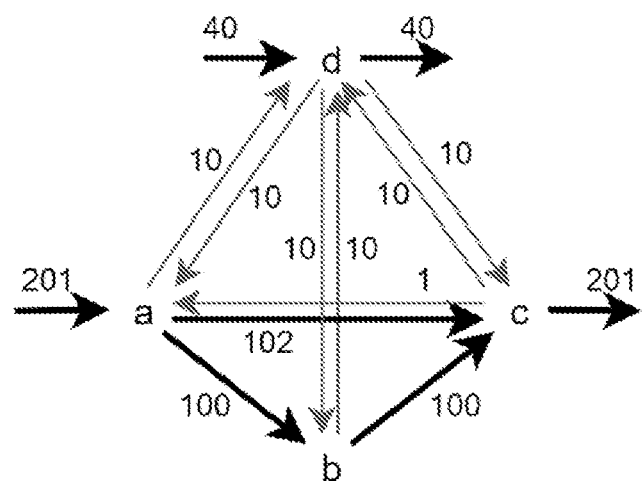
FIG. 6 shows an exemplary directly follows graph of the process shown in FIG. 1, in accordance with one or more embodiments of the invention.

FIG. 6 shows an exemplary directly follows graph 600 of process 100 of FIG. 1, in accordance with one or more embodiments. Directly follows graph 400 depicts nodes for Activity A 102, Activity B 104, Activity C 106, and Activity D 108 and edges connecting nodes of activities that directly follow each other. Each edge is annotated with a value indicating a frequency of occurrence.

At step 504, the directly follows graph and the indirectly follows graph are filtered. The removal of infrequent edges and nodes from the directly follows graph and the indirectly follows graphs results in the generation of less complex process trees, while maintaining more frequent data. Further, filtering the directly follows graph and the indirectly follows graph avoids the removal of infrequent variants that includes frequent activities, which would occur if the event log was directly filtered.

In one embodiment, the directly follows graph and the indirectly follows graph are filtered by sorting pairs of activities (illustratively denoted a and b) in the event log that are in directly follows relation (denoted a→b) or strictly indirectly follows relation (denoted a⇢b). The pairs of activities are sorted based on the frequency of occurrence that they are in either directly follows relation or indirectly follows relation (respectively denoted |a→b| and |a⇢b₁|), which are determined from the directly follows graph and the indirectly follows graph, respectively. Pairs of activities are then identified in the sorted pairs of activities based on a filter threshold value f. Edges connecting the identified pairs of activities are removed in the directly follows graph and the indirectly follows graph. For example, the top (100−f) percent of the sorted pairs of activities (i.e., the most infrequent pairs of activities) may be identified and edges connecting the identified pairs of activities are removed from the directly follows graph and the indirectly follows graph. In one embodiment, the filter threshold value f is a user defined value received from user input. Such a user defined filter threshold value f allows for varying levels of model complexity as defined by the user. In one embodiment, when edges removed from the directly follows graph results in a node unconnected to that graph, that node is also removed from the graph.

Figure 7A:
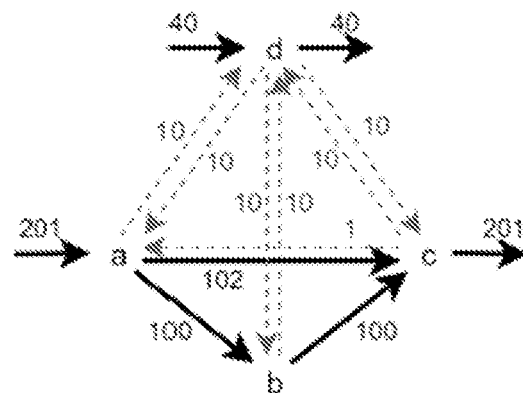
FIG. 7A shows a filtered graph of the directly follows graph shown in FIG. 6, in accordance with one or more embodiments of the invention.
Figure 7B:
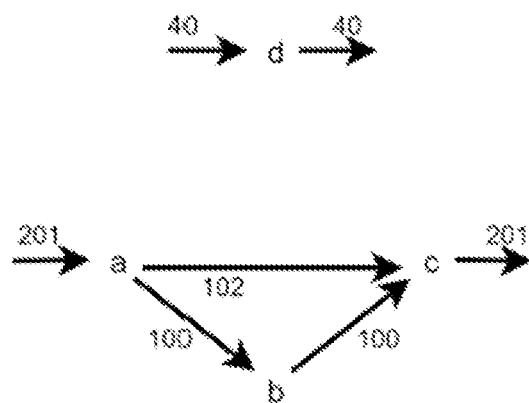
FIG. 7B shows a resulting graph representing the filtered graph shown in FIG. 7A with filtered edges removed, in accordance with one or more embodiments of the invention.

FIG. 7A shows a filtered graph 700 of directly follows graph 600 of FIG. 6, in accordance with one or more embodiments. The dashed edges in filtered graph 700 represent edges that are filtered from directly follows graph 600. The filtering was performed using a filter threshold value f of 93. FIG. 7B shows a resulting graph 710 representing filtered graph 700 with filtered edges removed, in accordance of one or more embodiments.

At step 506, activity relations scores are calculated for relationship operators for pairs of activities in the event log based on the filtered directly follows graph and the filtered indirectly follows graph. The relationship operators for a pair of activities a and b may include one or more (e.g., all) of an exclusive choice relationship operator (denoted $\underline{x}$), a sequence relationship operator (denoted $\rightarrow$), a parallel relationship operator (denoted $\underline{\wedge}$), a loop entry and loop exit relationship operator (denoted $\circlearrowleft_s$), and an indirect loop relationship operator (denoted $\circlearrowleft_i$). A loop entry and loop exit relationship operator for a and b refers to entry or exit of a loop from a to b. An indirect loop relationship operator for a and b refers to a strictly indirect relation between a and b within a loop. Other relationship operators are also contemplated.

The activity relations scores represent the probability that a relationship operator exists between a and b. The activity relation scores are calculated based on a frequency of occurrence of directly follows relations and/or indirectly follows relations between a and b determined using the filtered directly follows graph and/or the filtered indirectly follows graph. As explained with respect to FIG. 8, the frequency of occurrence may be used to infer the existence of relationship operators.

Figure 8:
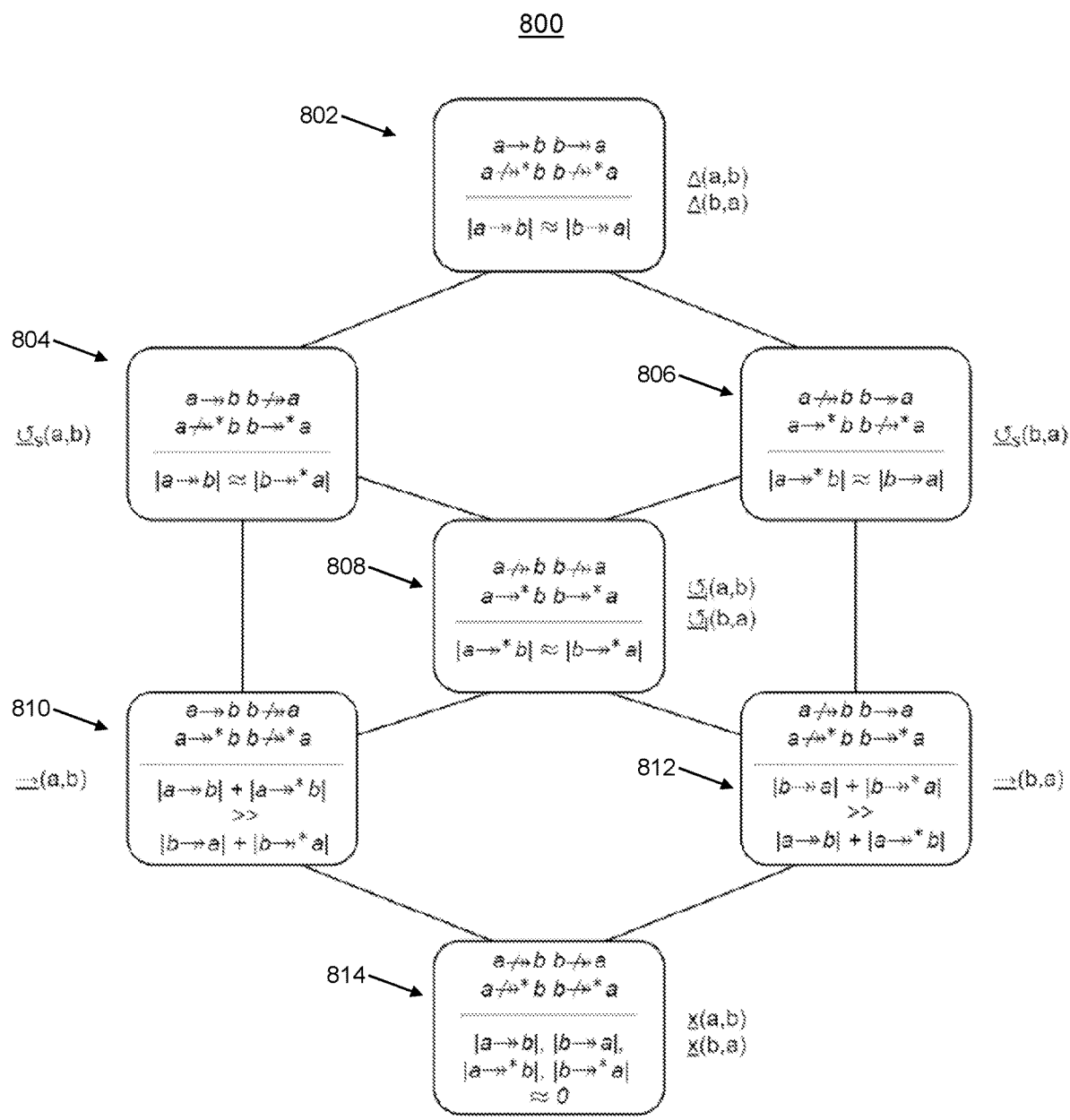
FIG. 8 shows a diagram illustrating the contribution of frequency information for inferring relationship operators for a pair of activities, in accordance with one or more embodiments of the invention.

FIG. 8 shows a diagram 800 illustrating the contribution of frequency information for inferring relationship operators for a pair of activities a and b, in accordance with one or more embodiments. In each block 802-814, information above the horizontal lines show the directly follows relations (denoted a→b) and the strictly indirectly follows relations (denoted a→⁺ b) contributing to inference of a relationship operator and the information below the horizontal line shows frequency information contributing to inference of the relationship operator.

As shown in block 814, an exclusive choice relationship operator between a and b can be inferred when the frequency of directly follows relations and strictly indirectly follows relations between a and b is relatively small (e.g., near zero), and vice versa for the exclusive choice relationship operator between b and a. As shown in block 810, a sequence relationship operator from a to b can be inferred when the frequency of directly follows relations and strictly indirectly follows relations from a to b is much larger than the frequency of those from b to a, and vice versa for the sequence relationship operator from b to a as shown in block 812. As shown in block 802, a parallel relationship operator between a and b can be inferred when the frequency of directly follows relations from a to b is approximately the same as the frequency of directly follows relations from b to a. As shown in block 804, a loop entry and loop exit relationship operator from a to b can be inferred when the frequency of directly follows relations from a to b is approximately the same as to the frequency of strictly indirectly follows relations from b to a, and vice versa for the loop entry and loop exit relationship operator from b to a as shown in block 806. As shown in block 808, the indirect loop relationship operator between a and b can be inferred when the frequency of strictly indirectly follows relations from a to b is approximately the same as the frequency of strictly indirectly follows relations from b to a.

The contribution of frequency information to infer relationship operators, as shown in FIG. 8, is utilized to generate formulas for calculating activity relation scores for each relationship operator for each pair of activities a and b in the event log. In one embodiment, the values of the activity relation scores for each relationship operator are within a range of 0 to 1. However, the values of the activity relation scores may represented in any suitable form. Let |a| and |b| denote the respective frequencies of activities a and b, |a→b| denote the frequency of directly follows relations from a to b, and |a→*b| denote the frequency of strictly indirectly follows relations from a to b.

The activity relation score $s_x$ for the exclusive choice relationship operator between a and b is calculated according to Equation (1) as follows:

$$s_x(a, b) = \frac{|a| - (|a \twoheadrightarrow b| + |b \twoheadrightarrow a| + |a \twoheadrightarrow^* b| + |b \twoheadrightarrow^* a|)}{|a|} + \frac{|b| - (|a \twoheadrightarrow b| + |b \twoheadrightarrow a| + |a \twoheadrightarrow^* b| + |b \twoheadrightarrow^* a|)}{|b|} / 2 \quad \text{Equation (1)}$$

Equation (1) compares the frequency of a and b (i.e., |a| and |b|) to the frequency when they are in relation with each other (i.e., |a→b|+|b→a|+|a→*b|+|b→*a|) in the filtered directly follows graph and the filtered indirectly follows graph. Equation (1) expresses the frequency of a and b not occurring together in the same traces, which implies that only either a or b should be present and, by extent, exclusive choice. The activity relation score $s_x$ is expressed as the difference between the frequency of the activity (a or b) and the frequency they are in relation with each other, normalized against the average occurrences of a and b. The less frequent that a and b are in relation with each other, the higher the activity relation score $s_x$, indicating a higher likelihood that an exclusive choice relationship operator exists between a and b. The more frequency that a and b are in relation with each other, the lower the activity relation score $s_x$, indicating a lower likelihood that an exclusive choice relationship operator exists between a and b.

The activity relation score $s_\rightarrow$ for the sequence relationship operator between a and b is calculated according to Equation (2) as follows:

$$s_\rightarrow(a, b) = \frac{|a \twoheadrightarrow b| + |a \twoheadrightarrow^* b| - |b \twoheadrightarrow a| + |b \twoheadrightarrow^* a|}{|a \twoheadrightarrow b| + |a \twoheadrightarrow^* b| + |b \twoheadrightarrow a| + |b \twoheadrightarrow^* a| + 1} \quad \text{Equation (2)}$$

Equation (2) compares the relations in one direction (i.e., |a→b|+|a→*b|) to relations in the other direction (i.e., |b→a|+|b→*a|), and normalizes the amount against their combined frequencies (i.e., |a→b|+|a→*b₁|+|b→a|+|b→*a|). If the first direction (i.e., a to b) is dominant, the activity relation score $s_\rightarrow$ will be between 0 and 1. If the other direction (i.e., b to a) is dominant, the activity relation score $s_\rightarrow$ will be between −1 to 0. Equation (2) has the property that for any activities a and b, $s_\rightarrow(a, b) = -s_\rightarrow(b, a)$. This property is used to calculate both $s_\rightarrow(a, b)$ and $s_\rightarrow(b, a)$ with a single calculation. To keep the activity relation score $s_\rightarrow$ within the 0 to 1 range, negative scores are rounded to 0.

The activity relation score $s_\wedge$ for the parallel relationship operator between a and b is calculated according to Equation (3) as follows:

$$s_\wedge(a, b) = \min\left(\frac{|a \twoheadrightarrow b|}{|b \twoheadrightarrow a|}, \frac{|b \twoheadrightarrow a|}{|a \twoheadrightarrow b|}\right) \quad \text{Equation (3)}$$

Equation (3) compares the direct relations between a and b. The closer in value |a→b| and |b→a| are, the more likely a and b are in a parallel relationship and the higher the activity relation score $s_\Lambda$. If both values for $|a \twoheadrightarrow b|$ and $|b \twoheadrightarrow a|$ are approximately equal in value, then the activity relation score $s_\Lambda$ is close to 1. If the values of $|a \twoheadrightarrow b|$ and $|b \twoheadrightarrow a|$ are different, then the minimum of $$\frac{|a \twoheadrightarrow b|}{|b \twoheadrightarrow a|}$$

and $$\frac{|b \twoheadrightarrow a|}{|a \twoheadrightarrow b|}$$

determines the activity relation score $s_\Lambda$ to ensure that the score falls within the range of 0 to 1.

The activity relation score $s_{\circlearrowleft_s}$ for the loop entry and loop exit relationship between a and b and the activity relation score $s_{\circlearrowleft_i}$ for the indirect loop relationship between a and b are calculated according to Equation (4) and Equation (5), respectively, as follows:

$$s_{\circlearrowleft_s}(a, b) = \min\left(\frac{|a \twoheadrightarrow b|}{|b \twoheadrightarrow *a|}, \frac{|b \twoheadrightarrow *a|}{|a \twoheadrightarrow b|}\right) \quad \text{Equation (4)}$$

$$s_{\circlearrowleft_i}(a, b) = \min\left(\frac{|a \twoheadrightarrow *b|}{|b \twoheadrightarrow *a|}, \frac{|b \twoheadrightarrow *a|}{|a \twoheadrightarrow *b|}\right) \quad \text{Equation (5)}$$

Equation (4) allows for the identification of the redo portion of a loop, where the loop repeats from activity a at an end of an iteration to activity b at the beginning of a next iteration. Equation (5) allows for the identification of activities in a strictly indirect relation within a loop. These notations of loop behavior cannot be aggregated into a single heuristic and are therefore evaluation separately. In Equation (4), the frequency of entering the redo portion of a loop is expressed is $|a \twoheadrightarrow b|$. If b is a redo activity, which is executed $|a \twoheadrightarrow b|$ times, a path returning from redo activity b to activity a is expected in the redo body $|b \twoheadrightarrow *a|$ with a similar frequency. This would indicate that a and b are in a loop entry and loop exit relationship. Exiting the redo portion of the loop can be evaluated in a similar manner by considering $s_{\circlearrowleft_s}$ (a, b), where a and b are switched in Equation (4). There can be multiple activities in the loop body and the redo portion of the loop. The loop entry and loop exit relationship $s_{\circlearrowleft_s}$ (a, b) indicates activity a in the loop body directly precedes an activity b in the redo portion, however this is not the case for all activities in the loop body or in the redo portion. Equation (5) provides for the evaluation of activities in an indirect loop. In an indirect loop, a and b strictly indirectly follow (i.e., $|a \twoheadrightarrow *b|$) and strictly indirectly precede (i.e., $|b \twoheadrightarrow *a|$) each other and, since this is a looping structure, the frequencies are expected to be similar.

Returning to FIG. 5, at step 508, a cut location in the event log and a relationship operator node are determined based on the activity relation scores. The cut location splits the event log $\Sigma$ into sub-event logs $\Sigma_1$ and $\Sigma_2$. The relationship operator node represents the behavior between the sub-event logs and may include, e.g., exclusive choice, sequence, parallel, or loop. The cut location is determined by evaluating all potential cut locations in the event log $\Sigma$ based on the accumulated activity relation scores for each relationship operator (i.e., exclusive choice relationship operator, sequence relationship operator, parallel relationship operator, loop entry and loop exit relationship operator, and indirect loop relationship operator). In one embodiment, a cut score is calculated for each relationship operator and for each potential cut location in the event log $\Sigma$. The potential cut locations include the transition between each pair of activities in the event log. The cut location and the relationship operator node are determined based on the cut scores.

The cut scores are calculated by first determining accumulated scores for a particular relationship operator. The accumulated scores for the exclusive choice relationship operator, sequence relationship operator, and parallel relationship operator are determined by calculating the average activity relation score over each pair of activities in potential sub-event logs $\Sigma_1$ and $\Sigma_2$ for each potential cut location. Let $c=(\oplus,\Sigma_1,\Sigma_2)$ be a cut with $\oplus \in \{x, \rightarrow, \Lambda\}$. Then $s_\oplus(\Sigma_1,\Sigma_2)$ denotes an accumulation score of cut c as follows:

$$s_\oplus\left(\sum\nolimits_1, \sum\nolimits_2\right) = \frac{\sum_{a \in \Sigma_1, b \in \Sigma_2} s_\oplus(a, b)}{\left|\sum\nolimits_1\right| \cdot \left|\sum\nolimits_2\right|} \quad \text{Equation (6)}$$

In one example, the accumulation score for cut $c=(\rightarrow, \{a,b\}, \{c,d\})$ is the average over the activity relations scores $s_\rightarrow(a, c)$, $s_\rightarrow(a, d)$, $s_\rightarrow(b, c)$, and $s_\rightarrow(b, d)$.

The accumulation scores for loop behavior are based on the combination of activity relation scores for the loop entry and loop exit relationship operator and the indirect loop relationship operator. Loop behavior comprises three parts: a redo$_{start}$ part, a redo end part, and an indirect part. As the body of a loop is exited, the redo part of the loop is entered, which signals a repetition of the loop. The redo$_{start}$ part of a loop represents the collection of activity pairs of which the first activity of the redo$_{start}$ part is the last activity of the body and the second activity of the redo$_{start}$ part is the first activity of the redo part. Once the redo part is over, the body is looped over. The redo$_{end}$ part of a loop represents the collection of activity pairs of which the first activity of the redo$_{end}$ part is a last activity of the redo part and the second activity is a first activity of the body. The indirect part of a loop represents activity pairs in the loop that are not within the redo$_{start}$ part or the redo$_{end}$ part. The activity pairs in the indirect part follow each other strictly indirectly. The accumulation score $s_\circlearrowleft (\Sigma_1,\Sigma_2,S_2,E_2)$ for a loop, where redo$_{start}$ activities is denoted $S_2$, redo end activities is denoted $E_2$, and $S_2, E_2 \subseteq \Sigma_2$, is as follows:

$$s_\circlearrowleft\left(\sum\nolimits_1, \sum\nolimits_2, S_2, E_2\right) = \quad \text{Equation (7)}$$

$$\frac{\text{redo}_{start} + \text{redo}_{end} + \text{indirect}}{|\text{redo}_{start}| + |\text{redo}_{end}| + |\text{indirect}|}$$

where:

$$\text{redo}_{start} = \sum\nolimits_{(a,b) \in End(L) \times S_2} s_{\circlearrowleft_s}(a, b) \quad \text{Equation (8)}$$

$$\text{redo}_{end} = \sum\nolimits_{(a,b) \in E_2 \times Start(L)} s_{\circlearrowleft_s}(a, b) \quad \text{Equation (9)}$$

$$\text{indirect} = \sum\nolimits_{\substack{a \in \Sigma_1, b \in \Sigma_2 \\ (a,b) \notin (End(L) \times S_2) \cup (E_2 \times Start(L))}} s_{\circlearrowleft_i} \quad \text{Equation (10)}$$

and where the number of activity pairs is determined as follows:

$$|redo_{start}|=|(a,b)\in End(L)\times S_2| \quad \text{Equation (11)}$$

$$|redo_{end}|=|(a,b)\in E_2\times Start(L)| \quad \text{Equation (12)}$$

$$|indirect|=|a\in \Sigma_1, b\in \Sigma_2, (a,b)\notin (End(L)\times S_2)\cup(E_2\times Start(L))| \quad \text{Equation (13)}$$

Although the accumulation score $s_{\circlearrowleft}$ ($\Sigma_1,\Sigma_2,S_2,E_2$) for a loop resembles averaging of scores, this is not the case. The number of pairs in $|\Sigma_1|\cdot|\Sigma_2|$ is not necessarily equal to the number of activity relation scores that are summed in $redo_{start}+redo_{end}+indirect$, making the division by $|\Sigma_1|\cdot|\Sigma_2|$ not a true average.

Silent loops, denoted $\circlearrowleft_\tau$, have a redo size of zero. A redo size of zero refers to a loop where the redo part of the loop (that must be executed in order for the loop body to be repeated) does not include any activities. The accumulation score $s_{\circlearrowleft_\tau}(\Sigma)$ for silent loops over event log $\Sigma$ is as follows:

$$s_{\circlearrowleft_\tau}\left(\sum\right) = \sum_{\substack{a\in\Sigma_1,b\in\Sigma_2 \\ (a,b)\in End(L)\times Start(L)}} s_{\circlearrowleft_\tau}(a,b) \quad \text{Equation (14)}$$

The accumulation scores do not always accurately identify the correct relationship operator. Accordingly, in one embodiment, the accumulation scores are modified to determine the cut scores.

For the exclusive choice relationship operator and the sequence relationship operator, the activity relation scores tend to be higher than for the other relationship operators. To address this, the standard deviation of the activity relation scores for the exclusive choice relationship operator and the sequence relationship operator is utilized to give more weight to seemingly outlying activity relation scores. The standard deviation allows for the detection of high variance in a set of scores, and by extension, outlying score values. The higher the standard deviation is, the more variance there is in the set of scores. The standard deviation is applied by subtracting it from the accumulation score. The modified accumulation score $s_\oplus^m(\Sigma_1,\Sigma_2)$ for the exclusive choice relationship operator and the sequence relationship operator for cut $c=(\oplus,\Sigma_1,\Sigma_2)$ with $\oplus\in\{x,\rightarrow\}$ is as follows:

$$s_\oplus^m(\Sigma_1,\Sigma_2)=s_\oplus(\Sigma_1,\Sigma_2)-\sigma(\{s_\oplus(a,b)|a\in\Sigma_1,b\in\Sigma_2\}) \quad \text{Equation (15)}$$

where $s_\oplus(\Sigma_1,\Sigma_2)$ is the accumulation score for the exclusive choice relationship operator and the sequence relationship operator (Equation (6)) and $\sigma(S)$ denotes the standard deviation of a multiset of values S.

The parallel relationship operator and the loop operators are similar on an activity relation level. The activity relation scores for the parallel relation operator and the loop operators depend on activities following each other in both directions with approximately equal frequency. Accordingly, the parallel relationship operator and the loop operators are difficult to differentiate. To better differentiate between parallel and looping behavior, the accumulated score is modified based on activities occurring multiple times per trace as activities occurring multiple times per trace is evidence of looping behavior. A modifier $mod_{para}$ that assesses the likelihood of parallel behavior and a modifier $mod_{loop}$ that assesses the likelihood of looping behavior are defined by comparing the number of traces with the average frequency of activities as follows:

$$mod_{para} = \min\left(\frac{|L|}{\left(\frac{||L||}{|\Sigma|}\right)}, 1\right) \quad \text{Equation (16)}$$

$$mod_{loop} = 2 - mod_{para} \quad \text{Equation (17)}$$

where L denotes the collection of traces in an event log, $|L|$ is the number of traces in the event log, $||L||$ is the total number of events in the event log, $\Sigma$ denotes all unique activities in the event log, and $|\Sigma|$ is the number of unique events.

The modified accumulation score $s_\wedge^m(\Sigma_1,\Sigma_2)$ for cut $c=(\wedge,\Sigma_1,\Sigma_2)$ for a parallel relationship operator is as follows:

$$s_\wedge^m(\Sigma_1,\Sigma_2)=s_\wedge(\Sigma_1,\Sigma_2)\cdot mod_{para} \quad \text{Equation (18)}$$

The modified accumulation score $s_{\circlearrowleft}^m(\Sigma_1,\Sigma_2)$ for cut $c=(\circlearrowleft,\Sigma_1,\Sigma_2)$ for a loop operator is as follows:

$$s_{\circlearrowleft}^m(\Sigma_1,\Sigma_2,S_2,E_2)=s_{\circlearrowleft}(\Sigma_1,\Sigma_2,S_2,E_2)\cdot mod_{loop} \quad \text{Equation (19)}$$

The modified accumulation score $s_{\circlearrowleft_\tau}^m(\Sigma_1,\Sigma_2)$ for a silent loop over $\Sigma$ is as follows:

$$s_{\circlearrowleft_\tau}^m(\Sigma)=s_{\circlearrowleft_\tau}(\Sigma)\cdot mod_{loop} \quad \text{Equation (20)}$$

In Equation (16), the modifier $mod_{para}$ is a measure of how many times the activities averagely occur $$\left(\frac{||L||}{|\Sigma|}\right)$$

per trace $|L|$. The more repetition of activities there is in the traces, the lower $mod_{para}$ becomes $mod_{para}$ is bounded to be at most 1, as activities occurring less than once per trace on average is not evidence of parallel behavior per se.

While the activity relation scores for the parallel relation operator and the loop operators are modified to better differentiate parallel and looping behavior, there are cases where nested parallel and looping behavior are difficult to distinguish, even on an activity relation level. In one embodiment, an activity relation modifier term is applied to modify the activity relation score $s_\wedge$ for the parallel relationship operator to better differentiate between parallel and looping behavior. Given a pair of activities a and b executing in the event log, the activity relation modifier ARM is calculated as follows:

$$ARM = \max\left(\frac{|Occur\cdot of\ a|}{|Occur\cdot of\ b\ between\ a|}, \frac{|Occur\cdot of\ b|}{|Occur\cdot of\ a\ between\ b|}\right) \quad \text{Equation (21)}$$

where |Occur. of a| refers to the frequency of occurrence of activity a, |Occur. of b| refers to the frequency of occurrence of activity b, |Occur. of b between a| refers to the frequency of occurrence of activity b between occurrences of activity a, and |Occur. of a between b| refers to the frequency of occurrence of activity a between occurrences of activity b. The term $$\frac{|Occur\cdot of\ a|}{|Occur\cdot of\ b\ between\ a|}$$

compares the frequency of occurrence of activity a with the frequency of occurrence of activity b between occurrences of activity a and the term $$\frac{|\text{Occur} \cdot \text{of } b|}{|\text{Occur} \cdot \text{of } a \text{ between } b|}$$

compares the frequency of occurrence of activity b with the frequency of occurrence of activity a between occurrences of activity b. A relatively higher number of |Occur. of b between a| or |Occur. of a between b| suggests that activities a and b are in a looping relationship rather than a parallel relationship. Accordingly, the activity relation modifier represents the likelihood of a looping relationship. The activity relation score $s_\Lambda$ for the parallel relationship operator in Equation (3) is therefore modified as follows:

$$s_\Lambda^{ARM}(a, b) = \frac{(s_\Lambda(a, b) + (1 - \text{Activity Relation Score}))}{2} \quad \text{Equation (22)}$$

The accumulated scores are all within the range of [0,1], which enables comparison between the modified accumulated scores. With the modification of the accumulated scores, this property no longer holds. However, as no further calculations or modifications are performed on the modified accumulated scores, the modified accumulated scores exceeding the [0,1] range has no impact.

The cut location and the relationship operator node are determined from the potential cut locations based on the cut scores. In one embodiment, the cut location and the relationship operator node are determined as the potential cut location for a particular relationship operator with the highest cut score.

At step 510, the event log is split into sub-event logs based on the cut location. To split the event log, traces of the event log are split according to the cut location. In one embodiment, traces that do not fit with the cut location are considered empty traces. The number of empty traces is tracked by the empty behavior counter. The empty behavior counter is incremented during log splitting and is reset when the event log is recursed upon during the skip log base case (at step 204 of FIG. 2).

In many applications, splitting an event log according to method 500 of FIG. 5 is impractical as calculating a cut score for each potential cut location at step 508 of FIG. 5 cannot be feasibly scaled. In particular, for an event log comprising n events, there are $2^n$ potential cut locations. As such, calculating cut scores for an event log comprising n+1 events has twice the computational complexity as calculating cut scores for an event log with n events. In one embodiment, rather than splitting an event log by calculating cut scores for each potential cut location according to method 500 of FIG. 5, an event log is split (e.g., at step 206 of FIG. 2) by calculating a best scoring partition, as described in further detail below with respect to FIGS. 10-15. The best scoring partition is calculated differently for each relationship operator in the event log. Calculating the best scoring partition in accordance with embodiments described herein reduces the computational complexity to polynomial running time as compared to calculating cut scores.

For the exclusive choice relationship operator and the parallel relationship operator, an event log is split according to an inverted undirected average minimum cut approach. FIG. 10 shows a method 1000 for splitting an event log of activities in an exclusive choice relationship or a parallel relationship into sub-event logs, in accordance with one or more embodiments. In one embodiment, the steps of method 1000 are performed at step 206 of FIG. 2. Method 1000 may be performed by one or more suitable computing devices, such as, e.g., computing system 900 of FIG. 9.

At step 1002, activity relation scores for pairs of activities in an exclusive choice relationship or a parallel relationship in an event log are calculated. In one embodiment, the activity relation scores are calculated according to steps 502, 504, and 506 of method 500 of FIG. 5.

At step 1004, an undirected graph of the activities is generated based on the activity relation scores. The exclusive choice relationship operator and the parallel relationship operator share a property of symmetry. Specifically, the activity relation score $s_x(a, b)$ for the exclusive choice relationship operator between activities a and b is equal to the activity relation score $s_x(b, a)$ for the exclusive choice relationship operator between activities b and a. Similarly, the activity relation score $s_\Lambda$ (a, b) for the parallel relationship operator between activities a and b is equal to the activity relation score $s_\Lambda$ (b, a) for the parallel relationship operator between activities b and a. Accordingly, the activity relation scores for the exclusive choice relationship operator and the parallel relationship operator may be visualized as undirected graphs, where each edge between activities a and b represent the activity relation score therebetween.

Consider the event log ⟨ A⟩ $^{10}$⟨ B,C⟩ $^{10}$, which identifies an exclusive choice relationship operator between activity A and activities B and C. This event log denotes that activity A is performed with a trace frequency of 10 and that activities B and C are performed with a trace frequency of 10. This event log has the following activity relation scores:

TABLE 1

Activity relation scores for event log⟨A⟩$^{10}$⟨B, C⟩$^{10}$

| Activity Relation Scores | A | B | C |
|---|---|---|---|
| A | — | 1.0 | 1.0 |
| B | 1.0 | — | 0 |
| C | 1.0 | 0 | — |

Figure 11A:
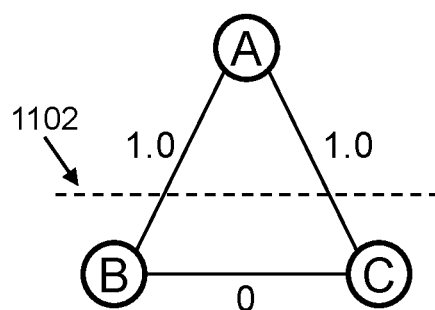
FIG. 11A shows an exemplary undirected graph visualizing activity relation scores for an event log, in accordance with one or more embodiments.

FIG. 11A shows an exemplary undirected graph 1100 visualizing the activity relation scores (shown in Table 1) for event log ⟨ A⟩ $^{10}$⟨ B,C⟩ $^{10}$, in accordance with one or more embodiments. Each of the activities in the event log is represented as a node in undirected graph 1100 and each transition between activities is represented as edges connecting nodes. Each edge connecting nodes for activities a and b is assigned a weight equal to the activity relation score between activities a and b. Dashed line 1102 identifies the ideal cut location.

One approach to determine the ideal cut location identified by dashed line 1102 is to determine the cut location that maximizes the activity relation scores, similar to maximum cut in graph theory. However, maximum cut is NP-hard, meaning that there are no algorithms available with better scaling than brute force. Another approach is minimum cut, which offers better scaling options as compared to maximum cut. The determination of the cut location may be translated from a maximum cut problem to a minimum cut problem because the activity relations scores representing the weights of undirected graph 1100 are within a range of [0,1]. Accordingly, the determination of the cut location according to a minimum cut problem is performed by inverting the weights of the edges of undirected graph 1100, which were assigned to be equal to the activity relation scores.

At step 1006 of FIG. 10, weights of edges of the undirected graph are inverted. In one embodiment, the weights of the edges of the undirected graph are inverted by subtracting the weights from 1. In undirected graph 1100 of FIG. 11A, the weight of each edge (a, b) between activities a and b are inverted according to $1-s_x(b, a)$. FIG. 11B shows an undirected graph 1110 representing undirected graph 1000 of FIG. 11A with inverted weights of the edges, in accordance with one or more embodiments.

At step 1008 of FIG. 10, an average minimum cut on the undirected graph is determined based on the inverted weights of the edges to determine a cut location of the event log. The average minimum cut is calculated using an adaptation of the Stoer-Wagner algorithm. One difference between the Stoer-Wagner algorithm and the average minimum cut lies in what they try to minimize. The Stoer-Wagner algorithm minimizes the sum of edge weights that are cut. The average minimum cut minimizes the average of edge weights that are cut, which more closely aligns with the goal of determining the ideal cut location.

At step 1010, the event log is split into sub-event logs based on the cut location. To split the event log, traces of the event log are split according to the cut location. An exclusive choice relationship operator or a parallel relationship operator defines the relationship between the sub-event logs.

The Stoer-Wagner algorithm has a complexity of $O(V \cdot E + V^2 \log V)$ in the boost implementation, where V is the number of activities in the log (or sub-event log) and E is equal to $V*(V-1)/2$. Since the number of cut locations to be found is equal to the number of activities in the event log, the Stoer-Wagner algorithm has a complexity of $O(n^4+n^3 \log n)$ where n is the number of activities in the event log. The average minimum cut has a similar complexity as the Stoer-Wagner algorithm.

Figure 12:
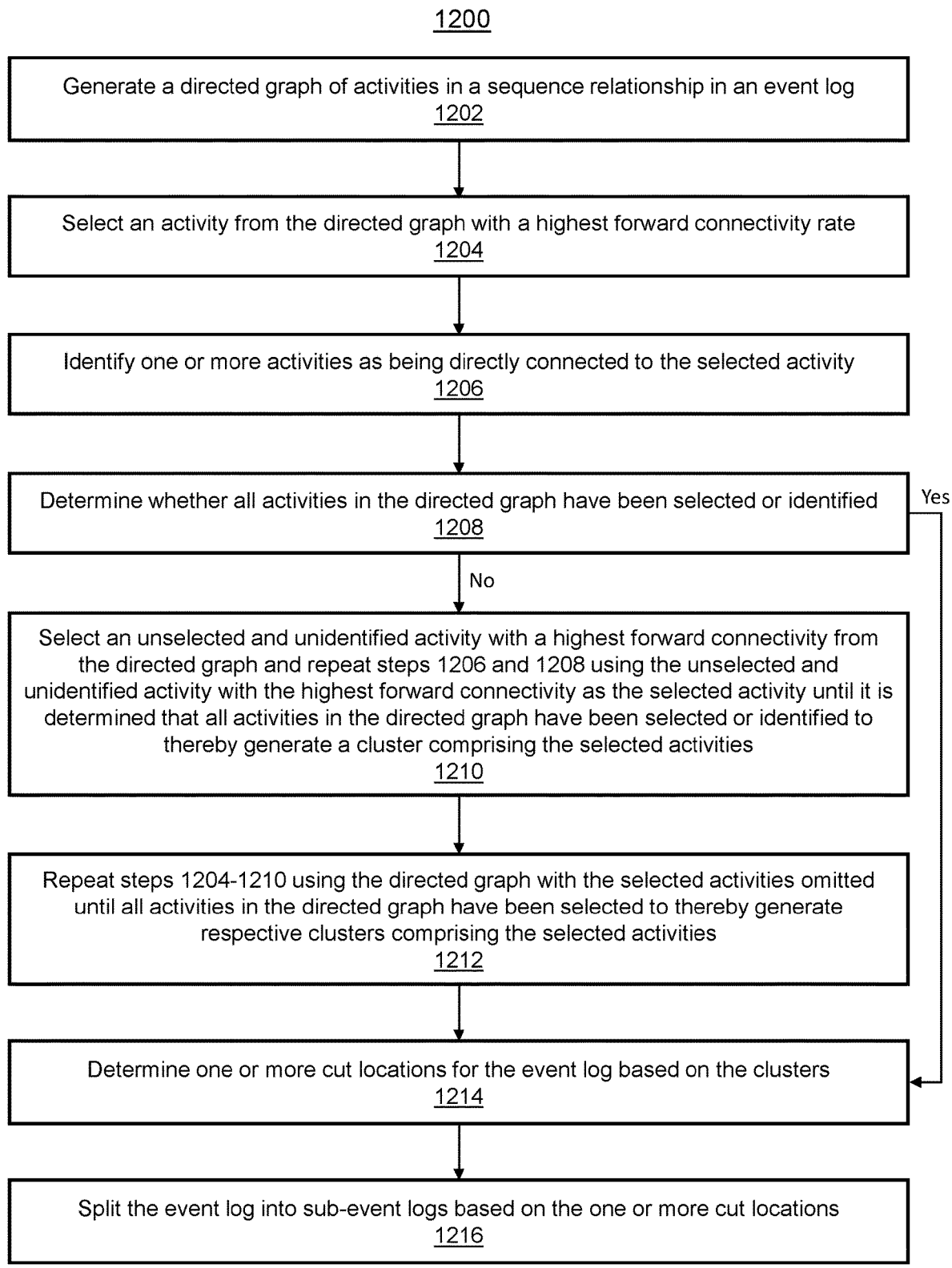
FIG. 12 shows a method for splitting an event log of activities in a sequence relationship into sub-event logs, in accordance with one or more embodiments.

For the sequence relationship operator, the event log is split according to an ordered sequence clustering approach. Sequences often occur between clusters of activities formed of other relationship operators. The cut locations between sequences of activities in the event log can therefore be determined by determining the clusters. FIG. 12 shows a method 1200 for splitting an event log of activities in a sequence relationship into sub-event logs, in accordance with one or more embodiments. In one embodiment, the steps of method 1200 are performed at step 206 of FIG. 2. Method 1200 may be performed by one or more suitable computing devices, such as, e.g., computing system 900 of FIG. 9.

At step 1202, a directed graph of activities in a sequence relationship in an event log is generated.

Figure 13A:
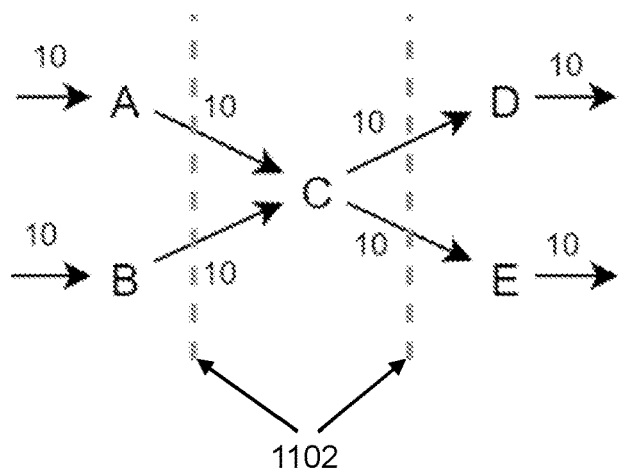
FIG. 13A shows an exemplary directly follows graph visualizing an event log, in accordance with one or more embodiments

Consider the event log ⟨ A, C, D⟩ $^5$⟨ B, C, D⟩ $^5$⟨ A, C, E⟩ $^5$ ⟨ B, C, E⟩ $^5$. As can be seen, each sequence in this event log starts with activity A or B, ends with activity D or E, and has activity C therebetween. FIG. 13A shows an exemplary directly follows graph 1300 visualizing event log ⟨ A, C, D⟩ $^5$⟨ B, C, D⟩ $^5$⟨ A, C, E⟩ $^5$⟨ B, C, E⟩ $^5$, in accordance with one or more embodiments. Dashed lines 1302 represent the ideal cut locations. To determine the ideal cut locations identified by dashed line 1302, a directed graph of the event log is constructed, as shown in FIG. 13B.

Figure 13B:
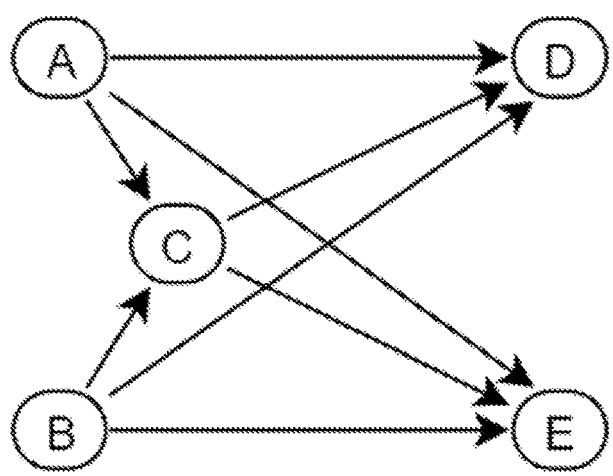
FIG. 13B shows a directed graph of an event log, in accordance with one or more embodiments.

FIG. 13B shows a directed graph 1310 of event log ⟨ A, C, D⟩ $^5$⟨ B, C, D⟩ $^5$⟨ A, C, E⟩ $^5$⟨ B, C, E⟩ $^5$, in accordance with one or more embodiments. Each of the activities in the event log is represented as a node in directed graph 1310 and each transition between activities is represented as edges connecting nodes. Each edge connecting nodes for activities a and b is assigned a weight equal to the activity relation score between activities a and b. The weight of the edges of directed graph 1310 is not shown in FIG. 13B for clarity. Cut locations in directed graph 1310 are determined by clustering activities.

At step 1204 of FIG. 12, an activity is selected from the directed graph with a highest forward connectivity rate. The forward connectivity rate of an activity may refer to the number of outgoing edges from a node of that activity. For example, the activity with the highest forward connectivity rate in directed graph 1310 of FIG. 13 is activity A (or activity B). The selected activity is added to a respective cluster.

At step 1206 of FIG. 12, one or more activities are identified as being directly connected to the selected activity. The activities identified as being directly connected to the selected activity are the activities directly connected to the selected activity by an outgoing edge from a node of that selected activity. For example, in directed graph 1310 of FIG. 13B, where activity A was selected, the activities identified as being directly connected to activity A are activities C, D, and E.

At step 1208 of FIG. 12, it is determined whether all activities in the directed graph have been selected (at step 1204) or identified (at step 1206). If all activities in the directed graph have been selected or identified, method 1200 proceeds to step 1214. If all activities in the directed graph have not been selected or identified, method 1200 proceeds to step 1210. For example, in directed graph 1310 of FIG. 13B, where activity A was selected, activity B has not been selected or identified.

At step 1210 of FIG. 12, an unselected and unidentified activity with a highest forward connectivity is selected from the directed graph and steps 1206 and 1208 are repeated using the unselected and unidentified activity with the highest forward connectivity as the selected activity until it is determined that all activities in the directed graph have been selected or identified to thereby generate a cluster comprising the selected activities. For example, in directed graph 1310 of FIG. 13B, where activity A was selected and activities C, D, and E were identified, activity B is the unselected and unidentified activity with the highest forward connectivity that is selected. Selected activity B is then added to the respective cluster. Repeating steps 1206 and 1208, activities C, D, and E are identified as being directly connected to activity B and it is determined that all activities in directed graph 1310 have been selected or identified. Accordingly, the respective cluster is generated to comprise activities A and B.

At step 1212 of FIG. 12, steps 1204 through 1210 are repeated using the directed graph with the selected activities omitted until all activities in the directed graph have been selected to thereby generate respective clusters comprising the selected activity. For example, in directed graph 1310 of FIG. 13B, steps 1204 through 1210 are repeated during a second iteration to select activity C (step 1204) and identify activities D and E (step 1206) to generate a cluster comprising activity C. Steps 1204 through 1210 are again repeated during a third iteration to select activity D (or activity E) (step 1204) and select activity E (or activity D)

(step 1210) to generate a cluster comprising activity D and E. Accordingly, the following clusters were determined from directed graph 1310: {A, B}, {C}, {D, E}.

At step 1214 of FIG. 12, a cut location for the event log is determined based on the clusters. The cut location is determined as being between the clusters.

At step 1216, the event log is split into sub-event logs based on the cut location. To split the event log, traces of the event log are split according to the cut location. The cut location translates to the highest accumulated cut score. A sequence relationship operator defines the relationship between the sub-event logs.

The clusters determined according to method 1200 of FIG. 12 are discovered in order of forward connectivity, meaning that the only possible cut locations are the cut locations determined at step 1214. As a result, there are at most n partitions to evaluate, with n being the number of activities in the event log. This has a computational complexity of $O(n^3)$, which combines to $O(n^4)$ after all iterations.

Loop behavior comprises three parts: a $redo_{start}$ part, a $redo_{end}$ part, and an indirect part forming the body. The cut locations between activities in a loop behavior are identified by identifying a body start cluster of activities, a body end cluster of activities, a $redo_{start}$ cluster of activities, and a $redo_{end}$ cluster of activities. FIG. 14 shows a method 1400 for splitting an event log of activities in a loop relationship into sub-event logs, in accordance with one or more embodiments. In one embodiment, the steps of method 1400 are performed at step 206 of FIG. 2. Method 1400 may be performed by one or more suitable computing devices, such as, e.g., computing system 900 of FIG. 9.

At step 1402, one or more activities corresponding to a body start portion of a loop, one or more activities corresponding to a body end portion of the loop, one or more activities corresponding to a redo start portion of the loop, one or more activities corresponding to a redo end portion of the loop are determined from a plurality of activities forming the loop in the event log. The activities corresponding to the body start portion of the loop are all activities that occur as the first activity in a trace of the event log. The activities corresponding to the body end portion of the loop are all activities that occur as the last activity of a trace of the event log.

The activities corresponding to the redo start portion of the loop are all activities that directly follow each of the activities corresponding to the body end portion of the loop for a sufficiently often threshold number of times. A candidate activity directly follows each of the activities corresponding to the body end portion of the loop for a sufficiently often threshold number of times when a frequency of this directly follows relation for the candidate activity is larger or equal to the total number of times a body end activity is followed by some other activity, divided by the number of activities that are not in either the body end or body start portion. That is, the sufficiently often threshold number of times may be calculated as follows:

$$|\text{Body End Act.} \twoheadrightarrow \text{Candidate Act.}| \geq \frac{\sum |\text{Body End Act.} \twoheadrightarrow \text{Remaining Act.}|}{|\text{Remaining Act.}|}$$

where Candidate Act. refers to the candidate activity, Body End Act. refers to activities corresponding to the body end portion of the loop, and Remaining Act. refers to all activities in the event log that are not in the set of body end activities or the set of body start activities. Accordingly, activities correspond to the redo start portion of the loop if they occupy a significant portion of the directly follows relations from all body end activities.

The activities corresponding to the redo end portion of the loop are all activities that directly precede each of the activities corresponding to the body start portion of the loop for a sufficiently often threshold number of times. A candidate activity directly precedes each of the activities corresponding to the body start portion of the loop for a sufficiently often threshold number of times when a frequency of this directly precedes relation for the candidate activity is larger or equal to the total number of times a body start activity is preceded by some other activity, divided by the number of activities that are not in either the body end or body start portion. That is, the sufficiently often threshold number of times may be calculated as follows:

$$|\text{Candidate Act.} \twoheadrightarrow \text{Body Start Act.}| \geq \frac{\sum |\text{Remaining Act.} \twoheadrightarrow \text{Body Start Act.}|}{|\text{Remaining Act.}|}$$

where Body Start Act. refers to activities corresponding to the body start portion of the loop.

Figure 15:
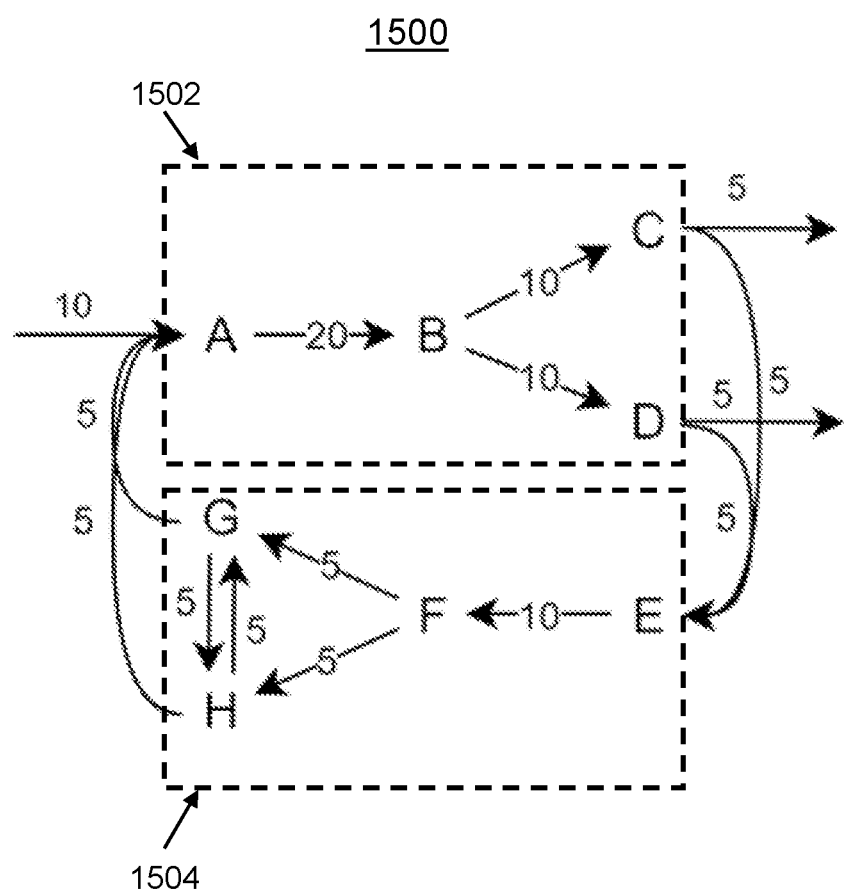
FIG. 15 shows a directly follows graph visualizing an exemplary event log, in accordance with one or more embodiments.

FIG. 15 shows a directly follows graph 1500 visualizing an exemplary event log $\langle A,B,C,E,F,G,H,A,B,D \rangle^5 \langle A,B,D,E,F,H,G,A,B,C \rangle^5$, in accordance with one or more embodiments. As can be seen in FIG. 15, activities A, B, C, and D form a body portion 1502 of a loop and activities E, F, G, and H form a redo portion 1504 of the loop. In directly follows graph 1500, activity A corresponds to a body start portion of the loop, activities C and D correspond to a body end portion of the loop, activity E corresponds to a redo start portion of the loop, and activities G and H correspond to a redo end portion of the loop.

At step 1404 of FIG. 14, a first cluster comprising the one or more activities corresponding to the body start portion of the loop and the one or more activities corresponding to the body end portion of the loop is generated. For example, in directly follows graph 1500 of FIG. 15, a cluster comprising activities A, C, and D is generated.

At step 1406 of FIG. 14, a second cluster comprising the one or more activities corresponding to the redo start portion of the loop and the one or more activities corresponding to the redo end portion of the loop is generated. For example, in directly follows graph 1500 of FIG. 15, a cluster comprising activities E, G, and H is generated.

At step 1408 of FIG. 14, each respective remaining activity of the plurality of activities is added to one of the first cluster or the second cluster based on: 1) a frequency of occurrence of the respective remaining activity between the one or more activities corresponding to the body start portion of the loop and the one or more activities corresponding to the body end portion of the loop, and 2) a frequency of occurrence of the respective remaining activity between the one or more activities corresponding to the redo start portion of the loop and the one or more activities corresponding to the redo end portion of the loop. In one embodiment, if the first frequency of occurrence is greater than the second frequency of occurrence, the respective remaining activity is added to the first cluster. If the first frequency of occurrence is not greater than the second frequency of occurrence, the respective remaining activity is added to the second cluster. For example, in directly follows graph 1500 of FIG. 15, the remaining activities (activities that were not clustered into the first cluster or the second cluster) are activities B and F. For activity B, the first frequency of occurrence is 20 and the second frequency of occurrence is 0 and thus activity B is added to the first cluster. For activity F, the first frequency of occurrence is 0 and the second frequency of occurrence is 10 and thus activity F is added to the second cluster.

At step 1410 of FIG. 14, a cut location for the event log is determined based on the first cluster and the second cluster. The cut locations are determined as being between the first cluster and the second cluster.

At step 1412, the event log is split into sub-event logs based on the cut location. To split the event log, traces of the event log are split according to the cut location. A loop relationship operator defines the relationship between the sub-event logs.

Figure 9:
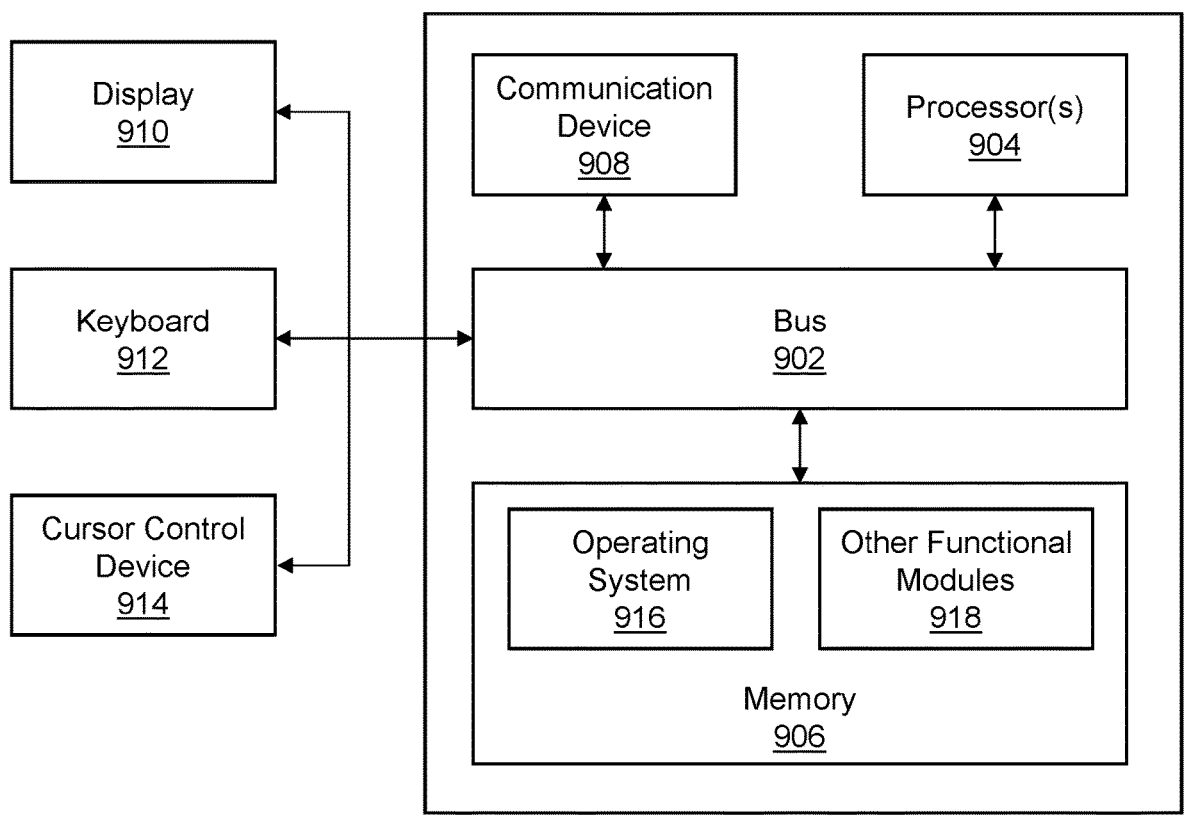
FIG. 9 is a block diagram of a computing system according to an embodiment of the invention.
Figure 10:
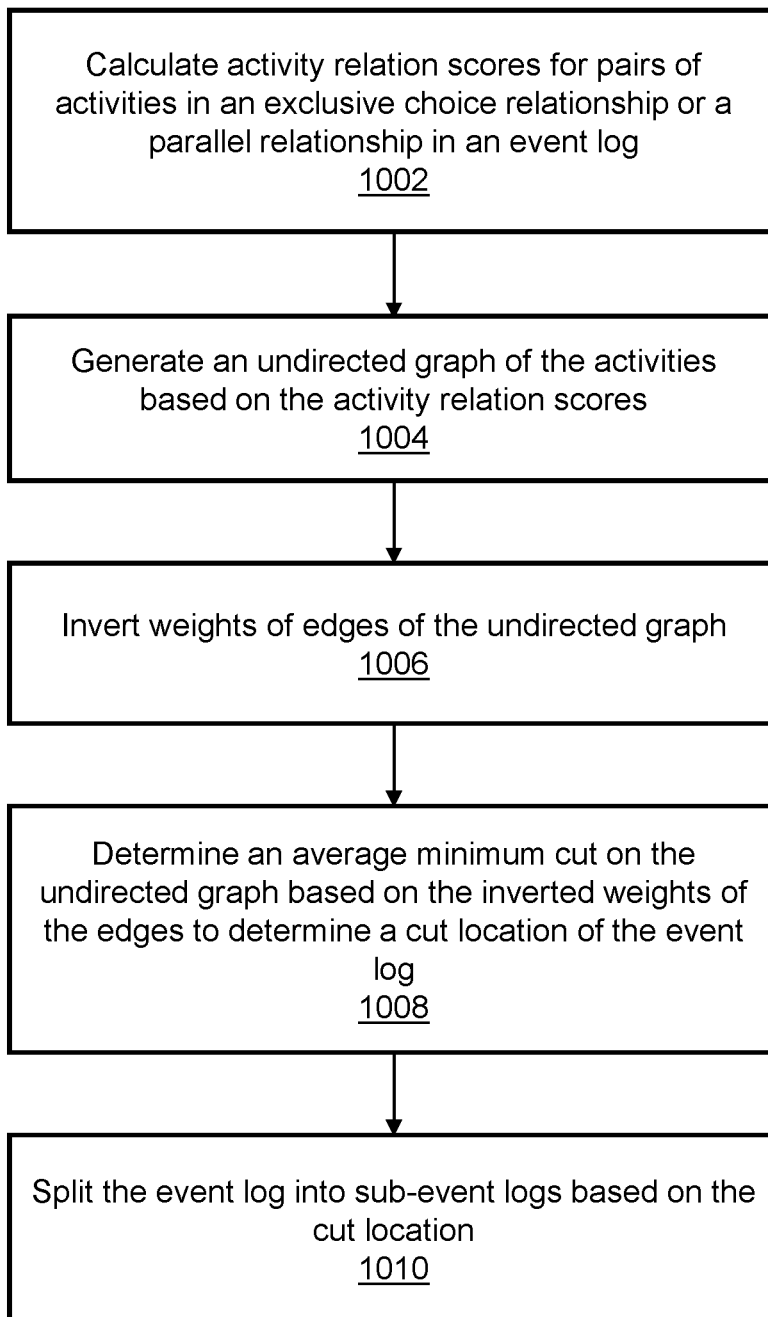
FIG. 10 shows a method for splitting an event log of activities in an exclusive choice relationship or a parallel relationship into sub-event logs, in accordance with one or more embodiments.
Figure 11B:
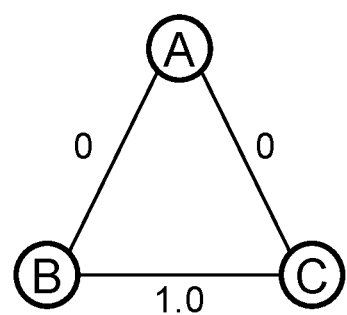
FIG. 11B shows an undirected graph representing undirected graph 1000 of FIG. 11A with inverted weights of the edges, in accordance with one or more embodiments.

FIG. 9 is a block diagram illustrating a computing system 900 configured to execute the methods, workflows, and processes described herein, including FIGS. 2, 5, 10, 12, and 14, according to an embodiment of the present invention. In some embodiments, computing system 900 may be one or more of the computing systems depicted and/or described herein. Computing system 900 includes a bus 902 or other communication mechanism for communicating information, and processor(s) 904 coupled to bus 902 for processing information. Processor(s) 904 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 904 may also have multiple processing cores, and at least some of the cores may be configured to perform specific functions. Multi-parallel processing may be used in some embodiments.

Computing system 900 further includes a memory 906 for storing information and instructions to be executed by processor(s) 904. Memory 906 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 904 and may include volatile media, non-volatile media, or both. The media may also be removable, non-removable, or both.

Additionally, computing system 900 includes a communication device 908, such as a transceiver, to provide access to a communications network via a wireless and/or wired connection according to any currently existing or future-implemented communications standard and/or protocol.

Processor(s) 904 are further coupled via bus 902 to a display 910 that is suitable for displaying information to a user. Display 910 may also be configured as a touch display and/or any suitable haptic I/O device.

A keyboard 912 and a cursor control device 914, such as a computer mouse, a touchpad, etc., are further coupled to bus 902 to enable a user to interface with computing system. However, in certain embodiments, a physical keyboard and mouse may not be present, and the user may interact with the device solely through display 910 and/or a touchpad (not shown). Any type and combination of input devices may be used as a matter of design choice. In certain embodiments, no physical input device and/or display is present. For instance, the user may interact with computing system 900 remotely via another computing system in communication therewith, or computing system 900 may operate autonomously.

Memory 906 stores software modules that provide functionality when executed by processor(s) 904. The modules include an operating system 916 for computing system 900 and one or more additional functional modules 918 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer implemented method for generating a process tree of a process, comprising:
   receiving an event log of the process;
   determining whether a base case applies to the event log and, in response to determining that the base case applies to the event log, adding one or more nodes to the process tree;
   in response to determining that the base case does not apply to the event log, splitting the event log into sub-event logs and adding one or more nodes to the process tree, wherein splitting the event log into sub-event logs comprises:
     generating a graph of certain activities in the event log,
     clustering the certain activities based on a number of outgoing edges of each of the certain activities in the graph, and
     determining a cut location of the event log based on the clusters;
   repeating the determining and the splitting for each respective sub-event log using the respective sub-event log as the event log until it is determined that the base case applies to the event log; and
   outputting the process tree.

2. The computer implemented method of claim 1, wherein splitting the event log into sub-event logs and adding one or more nodes to the process tree further comprises:
   calculating activity relation scores for pairs of activities in an exclusive choice relationship or a parallel relationship in the event log;
   generating an undirected graph of the activities based on the activity relation scores;
   inverting weights of edges of the undirected graph;
   determining an average minimum cut on the undirected graph based on the inverted weights of the edges to determine a cut location of the event log; and
   splitting the event log into sub-event logs based on the cut location.

3. The computer implemented method of claim 1, wherein the process is a robotic process automation process.

4. An apparatus comprising:
   a memory storing computer instructions for generating a process tree of a process; and
   at least one processor configured to execute the computer instructions, the computer instructions configured to cause the at least one processor to perform operations of:
     receiving an event log of the process;
     determining whether a base case applies to the event log and, in response to determining that the base case applies to the event log, adding one or more nodes to the process tree;
     in response to determining that the base case does not apply to the event log, splitting the event log into sub-event logs and adding one or more nodes to the process tree, wherein splitting the event log into sub-event logs comprises:
       generating a graph of certain activities in the event log,
       clustering the certain activities based on a number of outgoing edges of each of the certain activities in the graph, and
       determining a cut location of the event log based on the clusters;
     repeating the determining and the splitting for each respective sub-event log using the respective sub-event log as the event log until it is determined that the base case applies to the event log; and
     outputting the process tree.

5. The apparatus of claim 4, wherein splitting the event log into sub-event logs and adding one or more nodes to the process tree further comprises:
   calculating activity relation scores for pairs of activities in an exclusive choice relationship or a parallel relationship in the event log;
   generating an undirected graph of the activities based on the activity relation scores;
   inverting weights of edges of the undirected graph;
   determining an average minimum cut on the undirected graph based on the inverted weights of the edges to determine a cut location of the event log; and
   splitting the event log into sub-event logs based on the cut location.

6. A non-transitory computer-readable medium storing computer program instructions for generating a process tree of a process, the computer program instructions when executed by at least one processor cause the at least one processor to perform operations comprising:
   receiving an event log of the process;
   determining whether a base case applies to the event log and, in response to determining that the base case applies to the event log, adding one or more nodes to the process tree;
   in response to determining that the base case does not apply to the event log, splitting the event log into sub-event logs and adding one or more nodes to the process tree, wherein splitting the event log into sub-event logs comprises:
     generating a graph of certain activities in the event log,
     clustering the certain activities based on a number of outgoing edges of each of the certain activities in the graph, and
     determining a cut location of the event log based on the clusters;
   repeating the determining and the splitting for each respective sub-event log using the respective sub-event log as the event log until it is determined that the base case applies to the event log; and
   outputting the process tree.

7. The non-transitory computer-readable medium of claim 6, wherein splitting the event log into sub-event logs and adding one or more nodes to the process tree further comprises:
   calculating activity relation scores for pairs of activities in an exclusive choice relationship or a parallel relationship in the event log;
   generating an undirected graph of the activities based on the activity relation scores;
   inverting weights of edges of the undirected graph;

determining an average minimum cut on the undirected graph based on the inverted weights of the edges to determine a cut location of the event log; and splitting the event log into sub-event logs based on the cut location.

8. The non-transitory computer-readable medium of claim 6, wherein the process is a robotic process automation process.

9. The apparatus of claim 4, wherein the process is a robotic process automation process.

\* \* \* \* \*

UNITED STATES PATENT AND TRADEMARK OFFICE
CERTIFICATE OF CORRECTION

| | | |
|---|---|---|
| PATENT NO. | : 11,892,934 B2 | Page 1 of 1 |
| APPLICATION NO. | : 17/161725 | |
| DATED | : February 6, 2024 | |
| INVENTOR(S) | : Scheepens et al. | |

It is certified that error appears in the above-identified patent and that said Letters Patent is hereby corrected as shown below:

In the Specification

In Column 8, Line 36, delete "(denoted a↠b)." and insert -- (denoted $a \twoheadrightarrow^* b$). --, therefor.

In Column 8, Line 39, delete "|a ↠ b$_1$)," and insert -- $|a \twoheadrightarrow^* b|$), --, therefor.

In Column 9, Line 29, delete "a ↠+ b)" and insert -- $a \twoheadrightarrow^* b$) --, therefor.

In Column 10, Line 47, delete "*b$_1$|" and insert -- $^* b|$ --, therefor.

In Column 12, Lines 21-24, delete " $\frac{\sum_{a\in\Sigma_1, b\in\Sigma_2} s_\oplus(a,b)}{|\Sigma_1||\Sigma_2|}$ " and insert -- $\frac{\sum_{a\in\Sigma_1, b\in\Sigma_2} s_\oplus(a,b)}{|\Sigma_1||\Sigma_2|}$ --, therefor.

Signed and Sealed this
Eleventh Day of June, 2024

*Katherine Kelly Vidal*
*Director of the United States Patent and Trademark Office*